US012120634B2

(12) United States Patent
Sirotkin et al.

(10) Patent No.: US 12,120,634 B2
(45) Date of Patent: *Oct. 15, 2024

(54) DEVICES AND METHODS FOR FLOW-CONTROL TRIGGERING AND FEEDBACK

(71) Applicant: Apple Inc., Cupertino, CA (US)

(72) Inventors: Alexander Sirotkin, Tel-Aviv (IL); Jaemin Han, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,087

(22) Filed: Sep. 5, 2023

(65) Prior Publication Data

US 2024/0080798 A1 Mar. 7, 2024

Related U.S. Application Data

(63) Continuation of application No. 16/615,337, filed as application No. PCT/US2018/038501 on Jun. 20, 2018, now Pat. No. 11,871,375.

(Continued)

(51) Int. Cl.
*H04W 68/00* (2009.01)
*H04L 1/1607* (2023.01)

(Continued)

(52) U.S. Cl.
CPC ......... *H04W 68/005* (2013.01); *H04L 1/1642* (2013.01); *H04W 28/06* (2013.01); *H04W 80/08* (2013.01); *H04W 84/18* (2013.01)

(58) Field of Classification Search
CPC ............... H04W 68/005; H04W 28/06; H04W 80/08; H04W 84/18; H04L 1/1642
See application file for complete search history.

(56) References Cited

U.S. PATENT DOCUMENTS

2015/0043435 A1* 2/2015 Blankenship ......... H04L 1/1874 370/329
2015/0085667 A1 3/2015 Sivanesan
(Continued)

FOREIGN PATENT DOCUMENTS

CN 104041102 9/2014
CN 104303563 1/2015
(Continued)

OTHER PUBLICATIONS

Huawei, Hisilicon; "PDCP consideration for flow control"; 3GPP TSG RAN WG2 Meeting #98 R2-1705215; Hangzhou, China, May 15, 2017; 2 Pages.

(Continued)

*Primary Examiner* — Jackie Zuniga Abad
(74) *Attorney, Agent, or Firm* — Kowert, Hood, Munyon, Rankin & Goetzel, P.C.

(57) ABSTRACT

Devices, methods, communication nodes, base stations, storage media, and other embodiments are provided for managing associations in a communication network. In one example embodiment, a New Radio (NR) node is configured for NR user-plane protocol communications between a master node (MN) and a secondary node (SN). The NRnode is configured to generate a downlink (DL) user data message with downlink user data, initiate transmission of the DL user data message to a second node, and process a DL data delivery status message from the second node in response to the DL user data message. In various embodiments, polling and SCG split-bearer configurations are supported by such messaging. In some embodiments, packet data convergence protocol (PDCP) serial numbers are communicated for transmission and retransmission management. In some embodiments, DL configurations initiated by an SN are (Continued)

enabled, as well as UL configurations initiated by either an MN or an SN.

20 Claims, 14 Drawing Sheets

Related U.S. Application Data

(60) Provisional application No. 62/522,557, filed on Jun. 20, 2017, provisional application No. 62/522,515, filed on Jun. 20, 2017.

(51) Int. Cl.

| | |
|---|---|
| ***H04W 28/06*** | (2009.01) |
| ***H04W 80/08*** | (2009.01) |
| *H04W 84/18* | (2009.01) |

(56) References Cited

U.S. PATENT DOCUMENTS

| | | | |
|---|---|---|---|
| 2016/0183103 | A1 | 6/2016 | Saily |
| 2016/0337254 | A1 | 11/2016 | Karaki et al. |
| 2016/0352643 | A1 | 12/2016 | Xiao |
| 2017/0135023 | A1 | 5/2017 | Jung et al. |
| 2019/0190657 | A1 | 6/2019 | Sun et al. |
| 2019/0327607 | A1 | 10/2019 | Xiao et al. |

FOREIGN PATENT DOCUMENTS

| | | |
|---|---|---|
| CN | 104837127 | 8/2015 |
| CN | 105101253 | 11/2015 |
| CN | 106717055 | 5/2017 |
| CN | 106797581 | 5/2017 |
| WO | 2016121307 | 8/2016 |

OTHER PUBLICATIONS

CMCC; Flow control function enhancement in LTE-NR DC; 3GPP TSG-RAN WG2 NR AdHoc R2-1706991; Qingdao, China, Jun. 27, 2017; 3 pages.

Nokia, Alcatel-Lucent Shanghai Bell; “Introduction of F1 User Plane protocol”; 3GPP TSG-RAN WG3 Meeting #96 R3-171438; Hangzhou, China, May 15, 2017; 11 Pages.

Extended European Search Report for Patent Application No. EP 18820461; Feb. 5, 2021;11 Pages.

Office Action for CN Patent Application No. 201880041269.0; Dec. 2, 2022.

Huawei “DL Flow control for EN-DC”; 3GPP TSG-RAN WG3 Meeting #96 R3-171881; May 7, 2017.

* cited by examiner

DEVICES AND METHODS FOR FLOW-CONTROL TRIGGERING AND FEEDBACK

PRIORITY CLAIM

This application is a continuation of U.S. patent application Ser. No. 16/615,337, filed Apr. 14, 2020, titled "DEVICES AND METHODS FOR FLOW-CONTROL TRIGGERING AND FEEDBACK", which is a U.S. National Stage filing of International Application No. PCT/US2018/038501, filed Jun. 20, 2018, which claims the benefit of priority to U.S. Provisional Application No. 62/522,557, filed Jun. 20, 2017 and titled "ENHANCING NETWORK FLOW CONTROL TRIGGERING AND FEEDBAK", and U.S. Provisional Patent Application No. 62/522,515, filed Jun. 20, 2017 and titled "ENHANCING NETWORK FLOW CONTROL TRIGGERING AD FEEDBACK". All of the aforementioned applications are incorporated herein by reference in their entireties.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to systems, methods, and component devices for wireless communications, and particularly to device access and associated operations in Third Generation Partnership Project (3GPP) communication systems.

BACKGROUND

Long-term evolution (LTE) and LTE-Advanced are standards for wireless communication information (e.g., voice and other data) for user equipment (UE) such as mobile telephones. Such systems operate with UEs communicating with a network via cells of radio access technology (RAT) systems with radio area networks (RANs) which may include base station systems such as evolved node Bs (eNBs) or next-generation node Bs (gNBs) for providing an initial wireless connection to the larger system. As part of managing connections between the system and UEs, network systems may manage persistence control of associations with RAN devices and IEs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
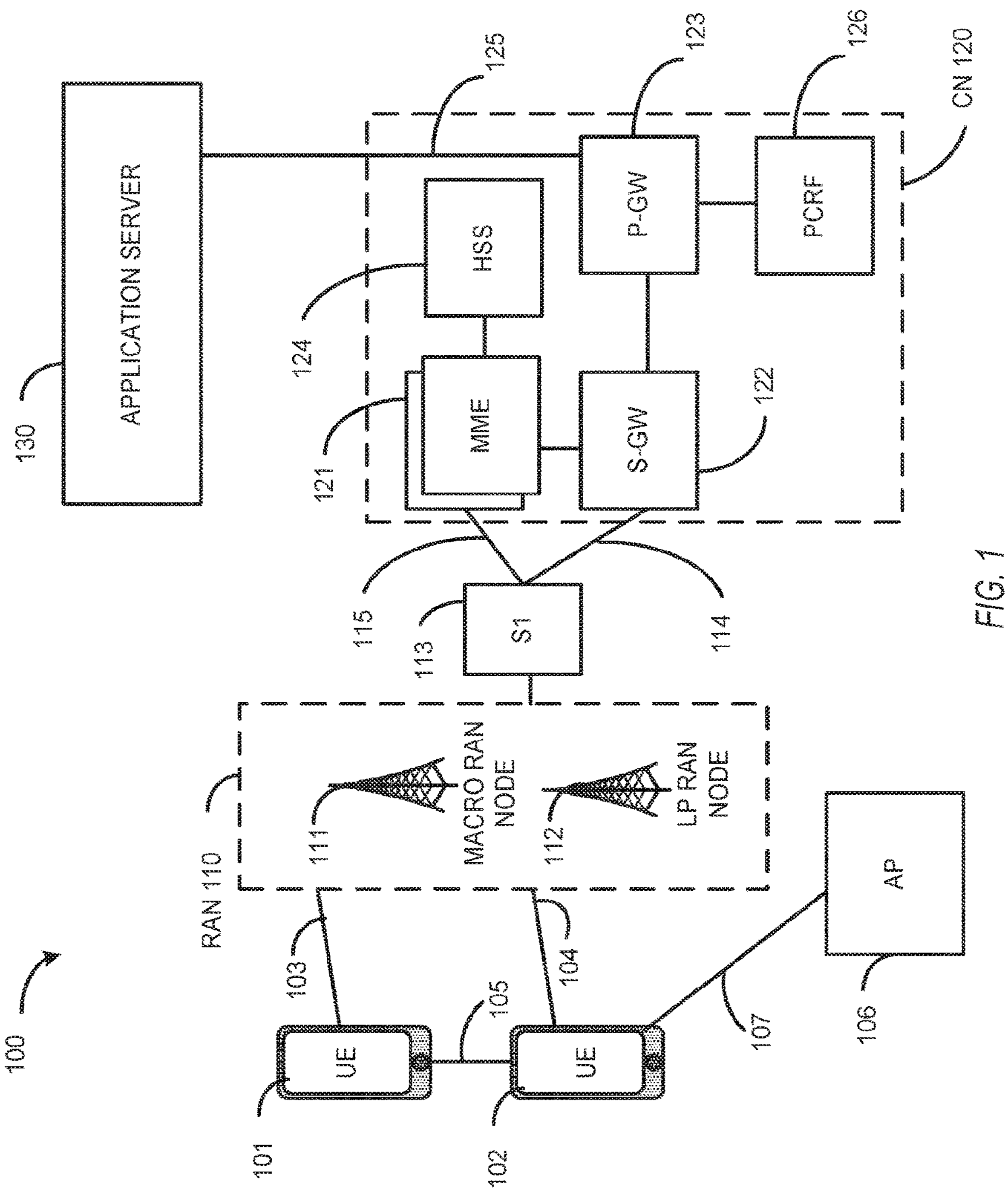
FIG. 1 is a diagram of a wireless network, in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (161) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSc) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect. e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG-RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long-Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via a connection 107. The connection 107 can comprise a local wireless connection, such as a connection consistent with any IEEE 802.11 protocol, wherein the AP 106 would comprise a Wi-Fit router. In this example, the AP 106 may be, for example, connected to the Internet without connecting to the core network of the wireless system (described in further detail below).

The RAN 110 can include one or more access nodes that enable the connections 103 and 104. These access nodes (ANs) can be referred to as base stations (BSs). NodeBs, evolved NodeBs (eNBs), next-generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., a macro RAN node 111, and one or more RAN nodes for providing femtocells or picocells (e.g., cells having smaller coverage areas, smaller user capacity, or higher bandwidth compared to macrocells), e.g., a low-power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single-Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted by a resource element. Each resource grid comprises a number of resource blocks, which describe the mapping of certain physical channels to resource elements. Each resource block comprises a collection of resource elements, in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH, among other things. It may also inform the UEs 101 and 102 about the transport format, resource allocation, and Hybrid Automatic Repeat Request (H-ARQ) information related to the uplink shared channel. Typically, downlink scheduling (e.g., assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Like the CCEs described above, each ECCE may correspond to nine sets of four physical resource elements known as enhanced resource element groups (EREGs). An ECCE may have other numbers of EREGs in some situations.

The RAN 110 is shown to be communicatively coupled to a core network (CN) 120 via an S1 interface 113. In some embodiments, the CN 120 may be an evolved packet core (EPC) network, a NextGen Packet Core (NPC) network, or some other type of CN. In this embodiment the S1 interface 113 is split into two parts: an S1-U interface 114, which carries traffic data between the RAN nodes 111 and 112 and a serving gateway (S-GW) 122, and an S1-mobility management entity (MME) interface 115, which is a signaling interface between the RAN nodes 111 and 112 and MMEs 121.

In this embodiment, the CN 120 comprises the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSNs). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network and external networks such as a network including an application server 130 (alternatively referred to as an application function (AF)) via an Internet Protocol (IP) communications interface 125. Generally, the application server 130 may be an element offering applications that use IP bearer resources with the core network (e.g., UMTS Packet Services (PS) domain. LTE PS data services, etc.). In this embodiment, the P-GW 123 is shown to be communicatively coupled to the application server 130 via the IP communications interface 125. The application server 130 can also be configured to support one or more communication services (e.g., Voice over Internet Protocol (VoIP) sessions. PTT sessions, group communication sessions, social networking services, etc.) for the UEs 101 and 102 via the CN 120.

The P-GW 123 may further be a node for policy enforcement and charging data collection. A Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class identifier (QCI), which commences the QoS and charging as specified by the application server 130.

In legacy LTE, network-based flow control via X2 has been defined for dual connectivity (DC). Similar mechanisms have also been defined for LTE wireless local area network (LTE-WLAN) aggregation (LWA) flow control via Xw.

In the context of New Radio (NR), network flow control is being discussed for three separate features: for Evolved Universal Mobile Telecommunications system Terrestrial Radio Access New Radio (E-UTRA-NR) Dual Connectivity (EN-DC) (e.g., via X2 interface), for fifth generation core network (5GC) (e.g., NGEN-DC) and Next-Generation Radio Area Network (NG-RAN) supported E-UTRA-NR DC (NE-DC) (e.g., via Xn interface), and for Central Unit (CU) and distributed unit (DU) split (e.g., via F1 interface).

In various systems, LTE DC flow control may be used as the baseline: however, embodiments disclosed herein include enhancements for network-based flow control for increased performance, better interoperability, and support for uplink and features unique to NR (e.g., secondary cell group (SCG) split-bearer operation, packet data convergence protocol (PDCP) duplication).

In embodiments of the present disclosure, we consider enhancements for the above use cases. The discussion of flow control may be broadly applied (e.g., using X2 as an example) with the understanding that enhancements are applicable to Xn, X2, and F1 interfaces.

Assuming LTE DC flow control in existing systems as the baseline, the following enhancements may be implemented (e.g., for X2, Xn, and F1 interfaces) in embodiments herein: 1) uplink support; 2) support for SCG split-bearer operation from the secondary node to the master node (e.g., for EN-DC, NGEN-DC, and NE-DC); 3) notification of highest successfully delivered PDCP protocol data unit (PDU) sequence number for PDCP duplication in the downlink: 4) notification of highest successfully received PDCP PDU sequence number for PDCP duplication in the uplink: and 5) different feedback triggering mechanisms (e.g., polling, configured periodicity, thresholds, etc.).

Figure 2:
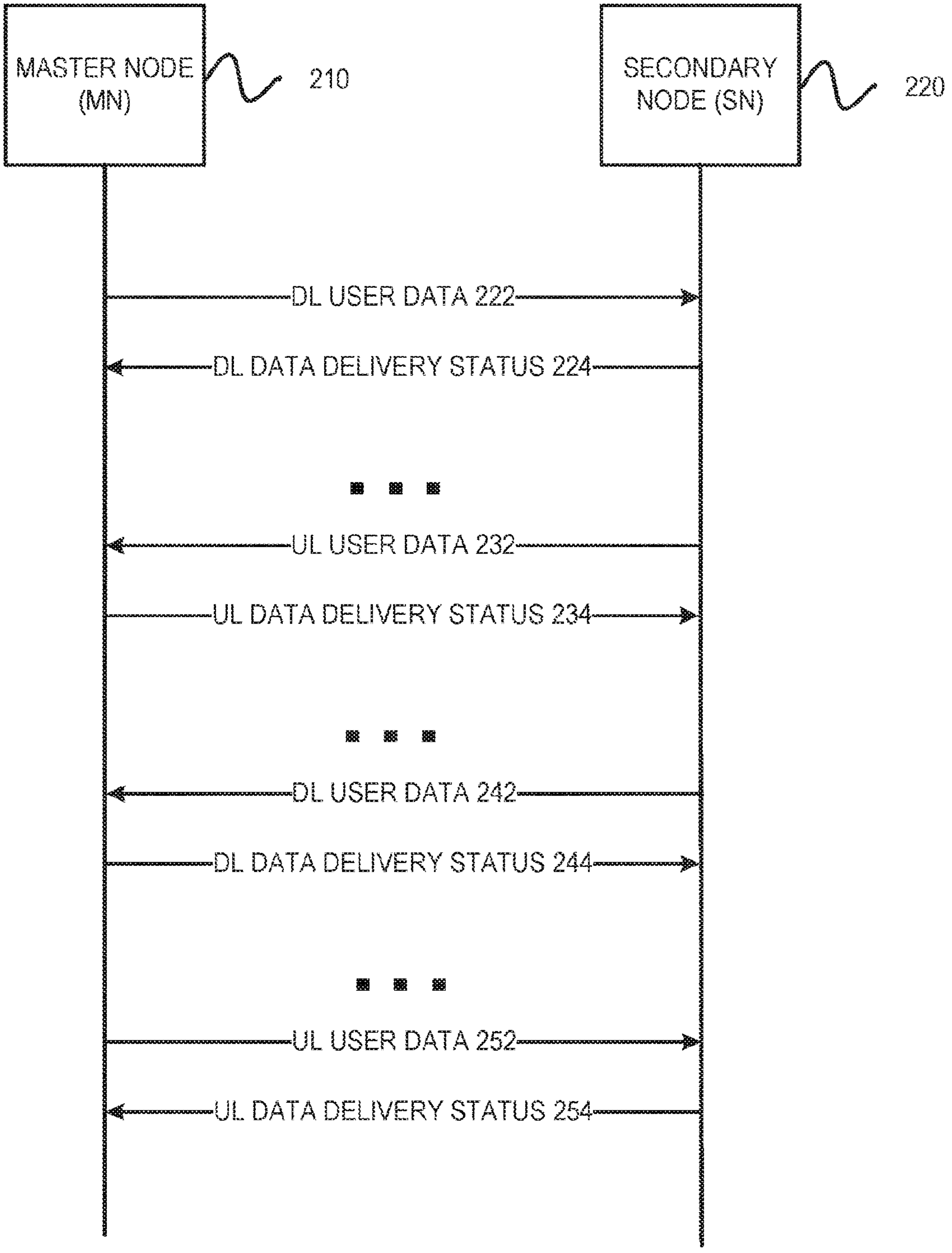
FIG. 2 describes aspects of communications between a master node and a secondary node in accordance with some embodiments described herein.

FIG. 2 illustrates aspects of various embodiments as described herein. FIG. 2 includes a master node (MN) 210 and a secondary node (SN) 220, which may communicate with each other in accordance with various embodiments described herein. In addition to the above-listed embodiments, other alternatives may operate with X2-based flow control without enhancements, which only control the downlink flow from the master node to the secondary node Such communications are illustrated by a DL user data communication 222 from the MN 210 to the SN 220, and a DL data delivery status communication 224 from the SN 220 to the MN 210 of FIG. 2. Such communications are part of the legacy mechanism. However, the legacy mechanism has certain deficiencies, such as that support for uplink and NR SCG split-bearer operation is not defined, and issues with enhancement for NR packet data convergence protocol (PDCP) duplication.

Stage-3 details for the enhancements of certain embodiments are thus described below. In some systems, there may be four frame formats for the X2 user-plane protocol, which may be applicable to the Xn and F1 interfaces as a baseline. These include DL USER DATA (PDU Type 0) and DL USER DATA EXTENDED (PDU Type 3), which may be defined to allow the secondary eNB (SeNB) to detect lost X2-U packets (e.g., packets lost on the X2 interface) and may be associated with the transfer of a downlink PDCP protocol data unit (PDU) over the X2-U interface. In various embodiments, the difference is the length of the PDCP sequence number (PDCP SN) to be supported. These also include DL DATA DELIVERY STATUS (PDU Type 1) and DL DATA DELIVERY STATUS EXTENDED (PDU Type 2), which may be defined to transfer feedback to allow the receiving master node (e.g., master eNB or MeNB) to control the downlink user data flow via the secondary node (e.g., secondary eNB or SeNB). Just as above, in some embodiments the difference may be the length of the PDCP SN to be supported.

To support the enhancements described in the principles above, Table 1 illustrates embodiments which may be represented as modifications of the legacy frame formats.

TABLE 1

| Bits | | | | | | | | Number of |
|---|---|---|---|---|---|---|---|---|
| 7 | 6 | 5 | 4 | 3 | 2 | 1 | 0 | Octets |
| PDU Type (=0) | | | | HS1 | HS2 | Spare | | 1 |
| X2-U Sequence Number | | | | | | | | 2 |
| Highest successfully delivered PDCP SN | | | | | | | | 2* {HS = 1} |
| Highest successfully received PDCP SN | | | | | | | | 2* {HS = 2} |
| Spare extension | | | | | | | | 0-4 |

Table 1 illustrates modification of DL USER DATA or DL USER DAL'/EXTENDED formats for use in accordance with embodiments described herein. In some embodiments, the modification descriptions may be based upon DL USER DAT A (PDU Type 0), but the same modifications can be applicable to other frame formats (e.g. PDU Type 3) as well. In other embodiments. Rather than modeling the legacy frame formats, a new format >. with a different PDU type number can be defined to support the enhancements.

In addition to the above embodiments, further embodiments may involve additional enhancements to frame formats. For uplink support enhancements, improvements may be made as follows. In legacy implementations, the uplink is transferred by the secondary node for the concerned E-UTRAN Radio Access Bearer (E-RAB) to the master node together 15 with a DL DATA. DELIVERY STATUS frame within the same GPRS Tunneling Protocol for the user plane (GTP-U) PDU. For the support off1mv control for uplink PDC:P PDU transfer, embodiments may define UL USER DATA and UL DATA DELIVERY STATUS for the uplink direction with different PDU type numbers, so that the uplink flow control is supported for the uplink as downlink flow control is for the downlink. Such enhancements enable a UL user data communication 232 and a UL data delivery status communication 234. For downlink in DC, the MN 210 is typically the node sending packets and receiving feedback from the SN 220. As illustrated by the communications 232 and 234, embodiments described herein enable uplink flow control where the roles of the MN 210 and the SN 220 may be reversed.

Embodiments described herein also enable support for secondary cell group (SCG) split-bearer operation from the SN 220 to the MN 210 (e.g., for EN-DC, NGEN-DC, and NE-DC). Since the SCG split-bearer operation may be introduced in NR, in embodiments described herein, the downlink PDCP PDUs may be able to be transferred from the SN 220 to the MN 210 through the DL USER DATA. Moreover, in embodiments, the DL DATA DELIVERY STATUS may be able to be sent by the MN 210 for flow control by the SN 220 on those PDCP PDUs transferred from the SN 220 to the MN 210. Such embodiments are described by a DL user data communication 242 and a DL data delivery status 244 of FIG. 2. In still further embodiments, the flow control for the uplink direction of SCG split-bearer operation can also be considered similar to the above uplink support. This is illustrated by a UL user data communication 252 and a UL data delivery status 254, which illustrate the uplink flow control of the SCG split-bearer operation.

In any such systems, some embodiments may include a notification of the highest successfully delivered PDCP PDU sequence number for PDCP duplication in the downlink. If some PDCP PDUs are transferred to the secondary node (e.g., intended to be delivered to the UE by the secondary node), then in some such embodiments, the master node does not transmit those PDCP PDUs and waits for them to be delivered to the user equipment (UE) by the secondary node. This may also be applied to SCG split-bearer operation in the downlink direction by reversing the roles of the master node and secondary node in the above description. In some such embodiments, this may occur unless there is a report of loss over the interface in order to avoid the duplicative transmissions to the UE from both the master node and the secondary node.

Some embodiments may operate with support for packet duplication within NR-PDCP. This includes the ability for the master node to retransmit PDCP PDUs which were transferred to the secondary node to the UE directly, and provides latency benefits (e.g., helps meet NR latency targets such as ultra-reliability low latency communications (URLLC), etc.).

For PDCP duplication issues, embodiments may include a mechanism whereby the master node provides the highest successfully delivered PDCP SN to the secondary node in DL USER DATA format, so that the secondary node can avoid transmitting the already delivered (by the master node) PDCP PDUs to the UE. This indication can be by setting the "HS1" field to 1 in Table 1 above so that the secondary node can know the highest successfully delivered SN that was delivered to the UE by the master node and remove the buffered downlink PDCP PDUs accordingly to avoid duplicative transmission. In some embodiments, this may also be applied to SCG split-bearer operation in the downlink direction by reversing the roles of the master node and secondary node in the above description. Additionally, in some embodiments this may also be applicable to the F1 interface (e.g., between a central unit (CU) and a distribution unit (DU)) in the downlink direction so that the CU provides the highest successfully delivered PDCP PDU SN to the DU (if they have already been delivered to the UE by another DU) to avoid duplicative transmission over that DU.

Further still, embodiments may include a notification of the highest successfully received PDCP PDU sequence number for PDCP duplication in the uplink. When the uplink bearer split is configured, if PDCP duplication is allowed for the uplink, it may be possible that the UE can retransmit PDCP PDUs, which were transmitted to the secondary node, to the master node again to meet the strict NR latency targets (e.g., such as URLLC, etc.).

Therefore, some embodiments may include a mechanism whereby the master node provides the highest successfully received PDCP SN to the secondary node, so that the secondary node can avoid transferring PDCP PDUs that were already successfully delivered to the receiving PDCP entity in the master node over the interface. Once the secondary node receives such a PDCP SN from the master node, the secondary node discards those already delivered PDCP PDUs among PDCP PDUs successfully received from the UE on the secondary node side. In some such embodiments, there may be various options for how to notify the secondary node of such a highest successfully received PDCP SN In one option, the DL USER DATA frame of the concerned E-RAB may be used. The indication can be by setting the "HS2" field to 1 (e.g., in Table 1 above) so that the secondary node can know the highest successfully received SN that was successfully delivered to the master node by the UE for the uplink direction and remove the buffered received PDCP PDUs to be carried over the interface to the master node. In a second option, the UL DATA DELIVERY STATUS frame may be used. A similar field structure to that of the first option can be considered for this UL DATA DELIVERY STATUS from the master node to the secondary node. In some embodiments, this can also be applied to SCG split-bearer operation in the uplink direction by reversing the roles of the master node and secondary node in the above description. Like other embodiments, this can be also applied to the F1 interface (between CU and DU) in the uplink direction so that the CU provides the highest successfully received PDCP PDU SN to the DU (if already received from the UE by another DU) to avoid duplicative transfer from that DU.

Figure 3:
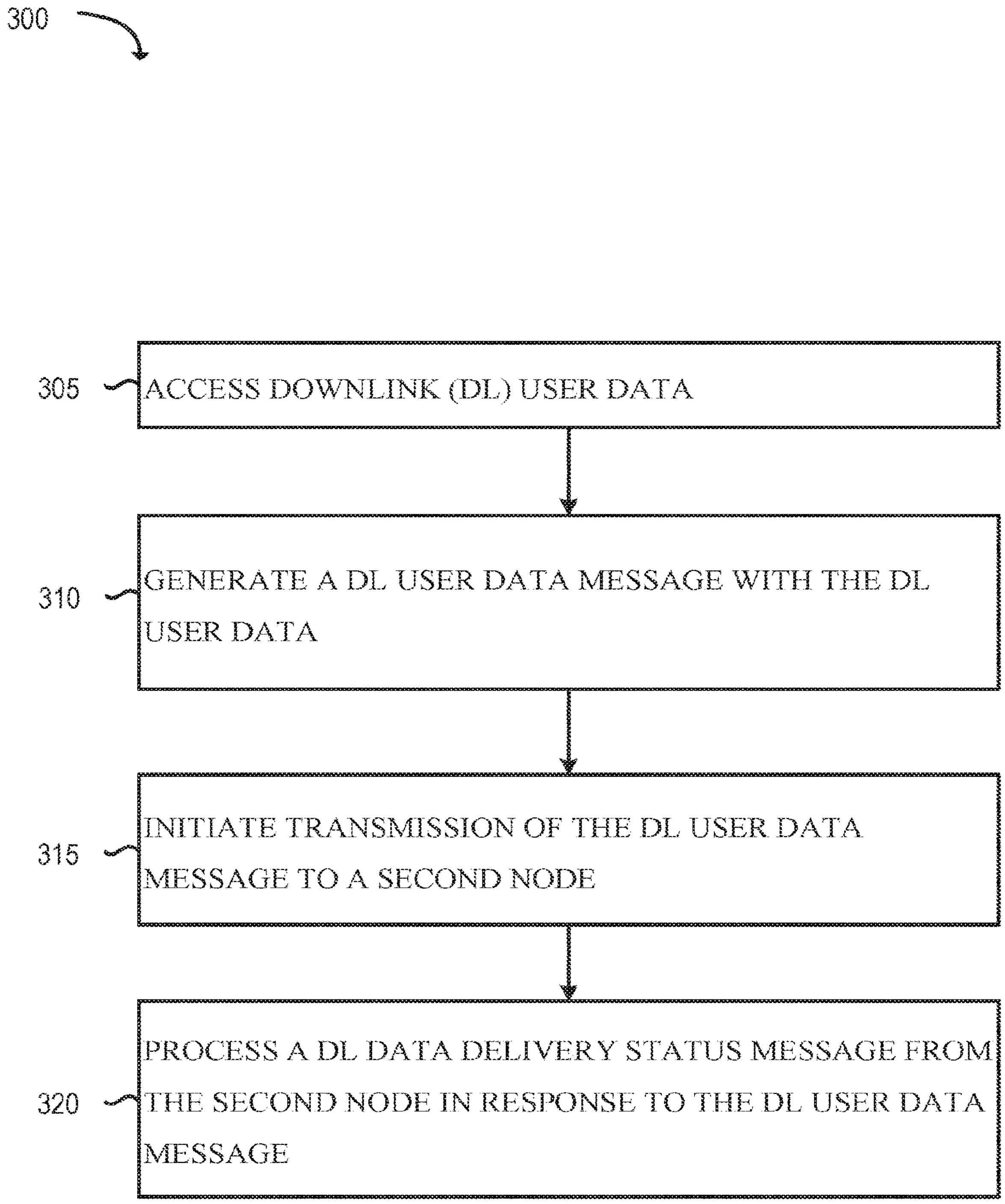
FIG. 3 describes a method performed by an apparatus of a node in accordance with some embodiments FIG. 4 describes aspects of communications between a master node and a secondary node in accordance with some embodiments described herein.

FIG. 3 illustrates an example method 300 performed by an apparatus of a node (e.g., a next-generation node B (gNB), evolved node B (cNB), or any such apparatus of a communication node) in accordance with the embodiments described herein (e.g., MN 210 or 410 or SN 220 or 420). In some embodiments, the method 300 of FIG. 3 may be implemented by one or more processors of a device or an apparatus of any machine used to implement a node that includes processing circuitry. In other embodiments, the method 300 may be implemented as computer-readable instructions in a storage medium that, when executed by one or more processors of a device, cause the device to perform the method 300. In some embodiments, the associated devices may be part of an NG-Radio Access Network (NG-RAN) node, with the associated device or apparatus within the NG-RAN comprising components such as processing circuitry, memory, interfaces, transmission circuitry, or other such circuit elements.

Method 300 includes operation 305 to access DL user data. The user data from operation 305 is then used in operation 310 to generate a DL user data message with the DL user data, and in operation 315, the processing circuitry initiates transmission of the DL user data message to a second node. The second node receives and processes the DL user data message, and performs corresponding operations to generate a DL data delivery status message. After the DL data delivery status message is received, the processing circuitry processes the DL data delivery status message from the second node that was generated and sent by the second node in response to the DL user data message in operation 320.

In various embodiments, the NR node comprises the SN and wherein the second node comprises the MIN. This enables an SN to manage messaging and data delivery in a manner known in previous 3GPP systems for MN and SN operations. In some such embodiments, the DL user data comprises a highest successfully delivered PDCP protocol data unit (PDU) sequence number. In still further embodiments, the DL user data message comprises a DL discard field based on the highest successfully delivered PDCP PDU sequence number indicating a sequence number up to and including which all NR PDCP PDUs should be discarded by the second node.

Some embodiments operate where the DL user data message comprises a first PDU type and the DL data delivery status message comprises a second PDU type. In some such embodiments, the DL data delivery status message comprises a parameter indicating a highest transmitted NR PDCP sequence number. In still further such embodiments, the DL data delivery status message comprises a parameter indicating a transmitted status associated with the highest transmitted NR PDCP sequence number. Still further embodiments may operate where the DL data delivery status message comprises a parameter indicating a highest retransmitted NR PDCP sequence number, or where the DL data delivery status message comprises a parameter indicating a status associated with the highest retransmitted NR PDCP sequence number Additionally, alternative embodiments may include similar operations for UL data, with the NR node as either the MN or the SN, and the second node operating as an MN when the NR node is the SN and the second node operating as an SN when the NR node is the MN.

In addition to the embodiments described above, for dual-connectivity operations and various communication systems described herein, additional embodiments may operate with new per-bearer metric feedback rather than per-bearer and per-UE buffer sizes (e.g., (average) throughput, (average) queuing delay, etc.) Additional embodiments may also further operate with optimization on the number of lost sequence number ranges reported. Other embodiments may operate with UE-based flow control: however, such systems (e.g., PDCP polling) have issues with standardized operation, and may have efficiency issues due to involvement of the air interface. Still another option is to keep legacy X2-based flow control without enhancements: however, the currently defined mechanism has certain deficiencies, including that report triggering is not defined (e.g., is left for the secondary cNB implementation), which may limit the efficiency of the scheduler in the master eNB Also, some metrics are defined with per-UE granularity, rather than per-bearer granularity, which may have a negative impact on quality of service (QoS). Also, generally, existing current metrics are rather coarse (e.g., limited to buffer status). The master node can, in theory, deduce other metrics (e.g., throughput) based on buffer status changes, but such estimation is slow and not precise.

Embodiments herein thus may use stage-3 user-plane details to provide enhancements. As described above, some systems operate with four frame formats for the X2 user-plane protocol, which will be applicable to the Xn and F1 interfaces as a baseline. These include DL USER DATA (PDU Type 0) and DL USER DATA EXTENDED (PDU Type 3), which are defined to allow the SeNB to detect lost X2-U packets (e.g., packets lost on the X2 interface) and are associated with the transfer of a downlink PDCP PDU over the X2-U interface. These also include DL DATA DELIVERY STATUS (PDU Type 1) and DL DATA DELIVERY STATUS EXTENDED (PDU Type 2), which are defined to transfer feedback to allow the receiving MeNB to control the downlink user data flow via the SeNB. To support the enhancements described in the principles above, embodiments may modify the legacy frame formats. Tables 2 and 3 below illustrate an example in accordance with some embodiments. Table 2 illustrates an example modification of a DL USER DATA format, and Table 3 illustrates an example modification of a DL DATA DELIVERY STATUS format.

TABLE 2

| Bits | | | | | | | | Number of |
|---|---|---|---|---|---|---|---|---|
| 7 | 6 | 5 | 4 | 3 | 2 | 1 | 0 | Octets |
| PDU Type (=0) | | | | PL | NM | TV | TH | 1 |
| X2-U Sequence Number | | | | | | | | 2 |
| Periodic Reporting Timer Value (in ms) | | | | | | | | Y1* {TV = 1} |
| Number of successfully delivered PDCP PDUs to UE | | | | | | | | Y2* {TH = 1} |
| Spare extension | | | | | | | | 0-4 |

TABLE 3

| Bits | | | | | | | | Number of |
|---|---|---|---|---|---|---|---|---|
| 7 | 6 | 5 | 4 | 3 | 2 | 1 | 0 | Octets |
| PDU Type (=1) | | | | PLR | NM | Final Frame Ind. | Lost Packet Report | 1 |
| OF1 | AV1 | HS2 | OF2 | AV2 | AV3 | BSR | Spare | 1 *{NM = 1} |
| The X2-U Sequence Number which triggers the feedback by polling | | | | | | | | 2* {PLR = 1} |
| The time that this report is compiled/transmitted | | | | | | | | Z1* {PLR = 4} |
| Highest successfully delivered PDCP Sequence Number | | | | | | | | 2 |
| Time offset (in ms) on highest successfully delivered PDCP Sequence Number | | | | | | | | Z2 *{OF1 = 1} |
| (Average) Throughput for the E-RAB (in-between reports) | | | | | | | | Z3 *{AV1 = 1} |
| Desired buffer size for the E-RAB | | | | | | | | 4 |
| Minimum desired buffer size for the UE | | | | | | | | 4 |
| Highest PDCP Sequence Number processed by RLC | | | | | | | | 2* {HS2 = 1} |
| Time offset (in ms) on highest PDCP Sequence Number processed by RLC | | | | | | | | Z4 *{OF2 = 1} |
| (Average) Queuing Delay until first transmitted (in-between reports) | | | | | | | | Z5 *{AV2 = 1} |
| (Average) RLC Delay per PDCP PDU until successfully confirmed to be delivered from the first transmitted (in-between reports) | | | | | | | | Z6 *{AV3 = 1} |
| Buffer Status Report from the UE | | | | | | | | Z7 *{BSR = 1} |
| Number of lost X2-U Sequence Number ranges reported (Type 1) | | | | | | | | 1 |
| Start of lost X2-U Sequence Number range | | | | | | | | 4 |
| End of lost X2-U Sequence Number range | | | | | | | | *{Number of reported lost X2-U SN ranges (Type 1)} |
| Number of lost X2-U Sequence Number ranges reported (Type 2) | | | | | | | | 1 |
| Start of lost X2-U Sequence Number range | | | | | | | | 3 |
| Consecutive number of lost X2-U packets from the Start of lost X2-U Sequence Number range above | | | | | | | | *{Number of reported tost X2-U SN ranges (Type 2)} |
| Spare extension | | | | | | | | 0-4 |

In such embodiments, the modifications are based upon DL USER DATA (PDU Type 0) and DL DATA DELIVERY STATUS (PDU Type 1), but the same modifications can be applicable to other frame formats (e.g., PDU Types 2 and 3) as well. In some embodiments, rather than modifying the existing frame formats, a new format with a different PDU type number can be defined to support the enhancements.

In some embodiments, the configuration information for the flow control enhancements can be delivered via a control-plane procedure from the master node to the secondary node. The configuration information can be delivered as part of the legacy procedure and message (e.g., in terms of X2-AP messages such as SENB ADDITION REQUEST, SENB MODIFICATION REQUEST, SENB RELEASE REQUEST, etc.) as a field. Alternatively, embodiments may include either new Class 1 or new Class 2 procedures with new message structures dedicated to flow control configuration setup, update, and release in the secondary node, as illustrated below in FIG. 5 and Table 4.

Figure 4:
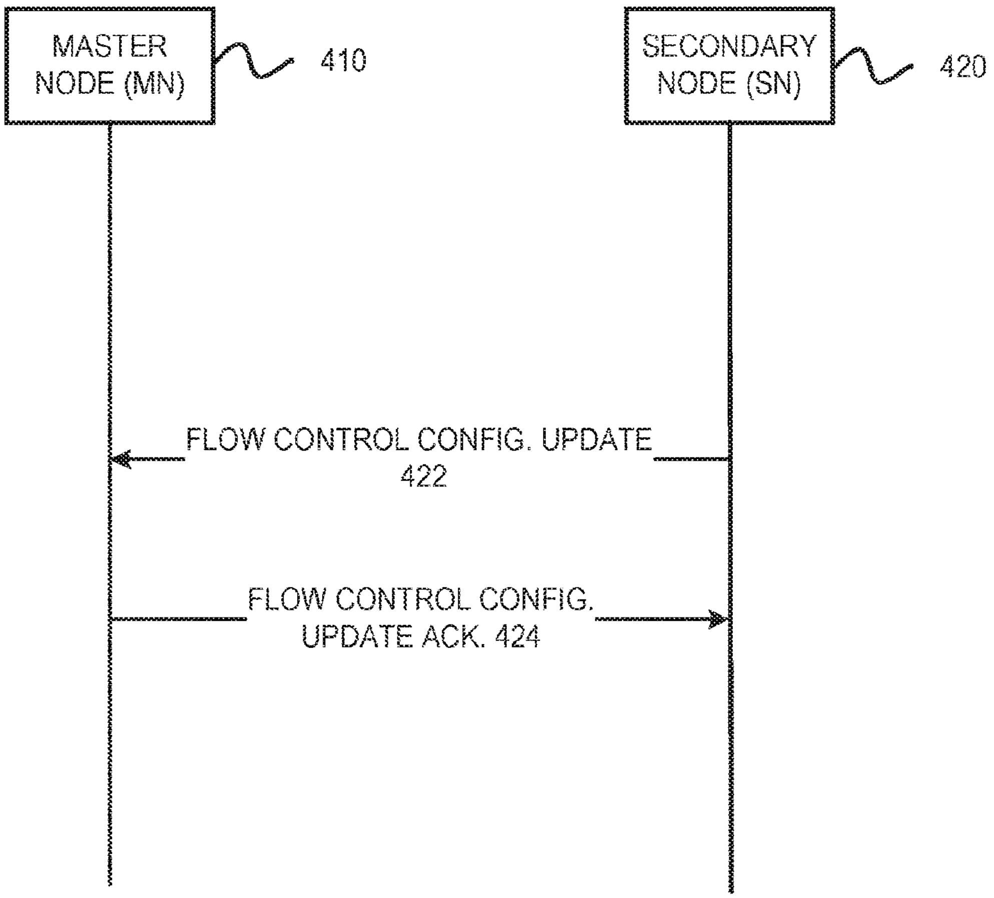

FIG. 4 shows a master node (MN) 410 and a secondary node (SN) 420. These two nodes include new communications for an X2-AP procedure for flow control configuration in the SN 420. In the illustrated embodiment, this includes a flow control configuration update communication 422, and a flow control configuration update acknowledge communication 424. Table 4 illustrates aspects of an associated flow control configuration update message, including details of information elements (IEs) and associated details of the data in the message.

TABLE 4

| IE/Group Name | Presence | Range | Criticality | Assigned Criticality |
|---|---|---|---|---|
| Message Type | M | | YES | reject |
| MeNB UE X2AP ID | M | | YES | reject |
| SeNB UE X2AP ID | M | | YES | reject |
| UE Context Information | | 0 . . . 1 | YES | reject |
| >FLOW CONTROL CONFIGURATION To Be Added List | | 0 . . . 1 | — | — |
| >> FLOW CONTROL CONFIGURATION Be Added Item | | 1 . . . <maxnoofBearers> | EACH | ignore |
| >>>CHOICE Configuration Type | M | | | |
| >>>>Configured Periodicity | | | | |
| >>>>>E-RAB ID | M | | — | — |
| >>>>> Periodic Reporting Timer Value (in ms) | M | | — | — |
| >>>>Threshold-based Feedback | | | | |
| >>>>>E-RAB ID | M | | — | — |
| >>>>> Number of successfully delivered PDCP PDUs to UE | M | | — | — |
| >FLOW CONTROL CONFIGURATION To Be Modified List | | 0 . . . 1 | — | — |
| >> FLOW CONTROL CONFIGURATION Be Modified Item | | 1 . . . <maxnoofBearers> | EACH | ignore |
| >>>CHOICE Configuration Type | M | | | |
| >>>>Configured Periodicity | | | | |
| >>>>>E-RAB ID | M | | — | — |
| >>>>> Periodic Reporting Timer Value (in ms) | M | | — | — |
| >>>>Threshold-based Feedback | | | | |
| >>>>>E-RAB ID | M | | — | — |
| >>>>> Number of successfully delivered PDCP PDUs to UE | M | | — | — |
| > FLOW CONTROL CONFIGURATION To Be Released List | | 0 . . . 1 | — | — |
| >> FLOW CONTROL CONFIGURATION To Be Released Item | | 1 . . . <maxnoofBearers> | EACH | ignore |
| >>>CHOICE Configuration Type | M | | | |
| >>>>Configured Periodicity | | | | |
| >>>>>E-RAB ID | M | | — | — |
| >>>>Threshold-based Feedback | | | | |
| >>>>>E-RAB ID | M | | — | — |

In legacy mechanisms, it is up to the secondary node (e.g., SeNB) to decide on when to trigger the DL DATA DELIVERY STATUS feedback. This may result in inefficient flow control, as the master node (e.g., the MeNB which hosts PDCP for master cell group (MCG) and secondary cell group (SCG) split-bearer operation) cannot control when to trigger the feedback. In order for the master node to estimate round-trip time (RTT) over the interface, the feedback controlling mechanism should be in place, which will help manage the flow control over the interface. Moreover, control over triggering will allow for more optimal scheduling implementation in the master eNB. To give such control to the master node, embodiments may include one or more of the following mechanisms.

A first mechanism includes polling. Some embodiments of polling may use a one-bit indication to trigger the feedback from the secondary node. This polling bit can be embedded onto the DL USER DATA format (e.g., denoted by the "PL" field above). Once the secondary node receives DL USER DATA with the PL field set to 1, the secondary node immediately compiles the feedback (e.g., DL DATA DELIVERY STATUS message) and transmits it over the interface. When the secondary node compiles DL USER DATA STATUS, the associated field (e.g., the PLR field) is set (e.g., to a value of 1) in order to notify the master node that this feedback is generated due to the polling request. Additionally, in some embodiments the X2-U Sequence Number which triggers the feedback by polling field is set to the X2-U Sequence Number in the received DL USER DATA. This triggers the polling, in order to let the master node know which DL USER DATA this feedback corresponds to. This will enable the master node to calculate the round-trip time (RTT) of the interface assuming that this report is compiled and transmitted as soon as the secondary node receives the polling. Alternatively, in some embodiments, a time that this report is compiled/transmitted can be set to the time that this DL DELIVERY DATA STATUS is compiled/transmitted to let the master node know the report timing and estimate the one-way delay (e.g., from the secondary node to the master node) of the interface (e.g., and thus estimate the RTT by doubling it), from the time that the master node receives this report. The length of this time value can be up to several octets, dependent on how it is specified (e.g., currently denoted by "Z1"). In various embodiments, this is a fixed (not variable) value within the format.

Another mechanism is configured periodicity. Such embodiments operate to make the secondary node report the feedback (e.g., DL DATA DELIVERY STATUS message) periodically, which helps the master node to estimate variations of the estimated RTT over the interface. In some such embodiments, the one-bit indication of the "TV" field in the DL USER DATA format, when set to 1, as the secondary node override (or set if not configured before), along with setting the current periodic reporting timer value to the value in the "Periodic Reporting Timer Value (in ms)" field, causes the SN to start providing the feedback according to that configured periodicity. The length of this timer value can be up to several octets, dependent on how it is specified (currently denoted by "Y1"), and it is a fixed (not variable) value within the format. In other embodiments, the configuration information for the periodic reporting can be delivered by the existing or new X2-AP procedures.

Still another mechanism for managing flow control in accordance with some embodiments is a threshold mechanism. In such embodiments, some threshold-based reporting can be configured at the secondary node to report the feedback (e.g., a DL DATA DELIVERY STATUS message) whenever the configured threshold is met. One example can be the use of a "Number of successfully delivered PDCP PDUs to UE" field, such that whenever this number (e.g., threshold) of PDCP PDUs are successfully delivered to the UE, the report is triggered. As in the configured periodicity mechanism, the one-bit "TH" field in the DL USER DATA format, when set to 1, along with the secondary node override (or set if not configured before), operates with the current threshold-based reporting value set to the value in the "Number of successfully delivered PDCP PDUs to UE" field and operates to start providing the feedback whenever such a number of PDCP PDUs are successfully delivered to the UE. A length of the threshold value can be up to several octets, dependent on how it is specified (currently denoted by "Y2"). In some embodiments, this is a fixed (not variable) value within the format. In other embodiments, the configuration information for the threshold-based reporting can be delivered by the existing or a new X2-AP procedure. In some embodiments, it is not desirable to configure periodic reporting and threshold-based reporting simultaneously so as not to confuse the master node.

Still further embodiments may operate with new metric feedback rather than per-bearer and per-UE buffer sizes (e.g., average throughput, average queuing delay, etc.). In legacy mechanisms, per-UE and per-bearer buffer size are used for flow control, but buffer sizes alone are crude for minute flow control. To better assist the buffer management and for optimal scheduling in the master node, the following metrics may be considered in addition to the existing buffer size advertisements from the secondary node: (Average) Throughput per bearer; (Average) Queuing delay (per PDCP PDU or average) per bearer until first transmitted. i.e., the delay from the first receipt by the secondary node until it is first transmitted: (Average) Delay (per PDCP PDU or average) per bearer until successfully confirmed to be delivered from the time first transmitted by radio link control (RLC). i.e., the delay of the RLC retransmission; and a Buffer Status Report from the UE. In other embodiments, other metrics or other metrics in combination with the above metrics may be used. In some embodiments, the master node can request the above metrics by setting the "NM" field to 1 in DL USER DATA. Once the secondary node receives DL USER DATA with the "NM" field set to 1, from that time, it compiles the DL DATA DELIVERY STATUS with the "NM" field set to 1, and provides the available new metrics with the relevant field set to 1 in DL DATA DELIVERY STATUS. The secondary node provides the feedback of new additional metrics until it receives DL USER DATA with the "NM" field set to 0.

In some embodiments, there are different options for how the (average) throughput per bearer can be provided to the master node. One embodiment operates by re-using the existing "Highest successfully delivered PDCP Sequence Number" in DL DATA DELIVERY STATUS This feedback operates to let the master node calculate the average throughput of this E-RAB. Some such embodiments may operate as follows. If the master node knows the RTT of the interface, and if the master node knows the time that this reported PDCP SN was transmitted to the secondary node, then the master node can calculate how long this PDCP SN took from the time it was received by the secondary node until it was successfully confirmed to be delivered by the UE. From this calculated time and the PDCP PDU size, the master node can estimate the throughput of this E-RAB. Moreover, in some embodiments the master node can calculate more accurate throughput if it uses the consecutive "Highest successfully delivered PDCP Sequence Number" reported from the secondary node. However, this estimate may not be exact since there may be a gap between the time that this PDCP SN was successfully confirmed to be delivered and the time that this PDCP SN was reported in DL DATA DELIVERY STATUS.

Therefore, embodiments may include a new metric, such as a "Time offset (in ms) on Highest successfully delivered PDCP Sequence Number" to let the master node know the time offset after which this PDCP SN was successfully confirmed to be delivered from the time that it was reported in DL DATA DELIVERY STATUS. The existence of this additional metric can be indicated, for example, when the OF1 field is set to 1. The length of this time offset value can be up to several octets, dependent on how it is specified (e.g., "23"). Such a value may be set to a fixed value within the format.

Another option for reporting throughput per bearer involves reporting the calculated average throughput directly by the secondary node. In some such embodiments, the secondary node can calculate and directly report the value of the average throughput per E-RAB. The average throughput may be calculated over the time between the consecutive feedback reports.

The existence of this additional metric can be indicated when the "AV" field is set to 1. The length of this time offset value can be up to several octets, dependent on how it is specified.

In some embodiments, the queuing delay (e.g., per PDCP PDU or average) until a PDCP PDU is first transmitted may also be reported. The additional metric of the queuing delay, reflecting how long the PDCP PDU is stored in the buffer of the secondary node until it is first transmitted over the air interface, can be provided to the master node to better manage the buffer of the secondary node and control the flow over the interface. To support the high data rate of the NR, there may be layer-2 protocol stacks to reduce the radio link control (RLC) and media access control (MAC) processing time to near zero ms when a transmission opportunity is available. Therefore, in such embodiments it is safe to neglect the RLC/MAC processing time, and the queuing delay can be defined from the time that the secondary node receives the PDCP PDU until the time that this PDCP PDU is processed by RLC/MAC and transmitted over the air interface. There are various options for how the (average) queuing delay per bearer can be provided to the master node.

One option involves using the highest PDCP sequence number processed by RLC. As in the first option described above for (average) throughput per bearer, for the queuing delay, the secondary node can report the highest PDCP sequence number processed by RLC. This PDCP SN can be reported with the "HS2" field set to 1 in DL DATA DELIVERY STATUS. The length of this field may be the same as the configured PDCP SN size. Moreover, as in the above-described first option for (average) throughput per bearer, the additional metric of "Time offset (in ms) on Highest PDCP Sequence Number processed by RLC" to indicate to the master node the time offset after which this PDCP SN was processed by RLC from the time that it was reported in DL DATA DELIVERY STATUS may be used. In some embodiments, the existence of this additional metric can be indicated when the "OF2" field is set to 1. The length of this time offset value can be up to several octets, dependent on how it is specified (e.g., denoted by "Z4").

Another option for queuing delay involves reporting the calculated queuing time or average queuing delay directly by the secondary node. In some embodiments, the secondary node can calculate the time that the PDCP PDU associated with the reported "Highest successfully delivered PDCP SN" is delayed from the time it is received until it is successfully confirmed to be delivered to the UE. Alternatively, the secondary node can calculate and directly report the value of the average queuing delay per E-RAB. The average queuing delay may be better calculated over the time between the consecutive reports. The existence of this additional metric "(Average) Queuing Delay until first transmitted (in-between reports)" can be indicated when the "AV2" field is set to 1 in some embodiments. The length of this delay value can be up to several octets, dependent on how it is specified (currently denoted by "Z5").

Delay (per PDCP PDU or average) of RLC re-transmission until PDCP PDUs are successfully confirmed to be delivered is another potential metric. In some embodiments, the additional metric of the RLC transmission/retransmission time from the time PDCP PDUs are first transmitted until they are successfully confirmed to be delivered can be provided to the master node to better manage the buffer of the secondary node and control the flow over the interface. This metric (either per PDCP PDU or average) can be calculated when the master node knows the above two metrics (throughput and queuing delay until first transmitted). However, the secondary node can calculate the time that the PDCP PDU associated with the reported "Highest successfully delivered PDCP SN" is delayed by the RLC transmission/retransmission until it is successfully confirmed to be delivered by the UE. In other embodiments, the secondary node can calculate its own value and directly report the average delay of the RLC transmission/retransmission until PDCP PDUs are successfully confirmed to be delivered. This metric may be calculated over a time between the consecutive reports. The existence of this additional metric "(Average) RLC Delay per PDCP PDU until successfully confirmed to be delivered from the first transmitted (in-between reports)" can be indicated when the "AV3" field is set to 1. The length of this delay value can be up to several octets, dependent on how it is specified (e.g., "Z6").

Further still, some embodiments may operate with a Buffer Status Report (BSR) from the UE. The BSR MAC control element (BSR MAC CE) reported by the UE to the secondary node can be provided to the master node for optimal scheduling, buffer management, and flow control. In some embodiments, the existence of this metric "Buffer Status Report from the UE" can be indicated when the "BSR" field is set to 1. (e.g., see table(s) above). In some embodiments a length of the BSR MAC CE can be up to 3 octets in accordance with MAC protocol specifications, but in NR it may be dependent on how it is specified (e.g., "Z7").

Finally, some embodiments may operate with optimization on a number of lost sequence number ranges reported. Legacy systems operate with DL DATA DELIVERY STATUS reporting the lost X2-U packets by the ranges of the consecutive X2-U packets lost (e.g., start and end of each range). Reporting the start and end of each range takes twice the number of octets of the X2-U sequence number. This range report may be efficient when a large number of consecutive X2-U packets are lost. However, this may be inefficient when a small number of consecutive X2-U packets are lost. Even if there are only small gaps of missing X2-U packets, each loss report will take up twice the number of octets of the X2-U sequence number to denote the start and end of each range. For example, suppose that there is only one missing X2-U packet, with a sequence number of 1. Then, the report will be "start=1" and "end=1", each taking up the size of the X2-U sequence number. In embodiments described herein, the reporting may be optimized by reporting a number of consecutive X2-U packets that were lost from the start sequence number. If the system limits this number to 1 octet, then this can effectively reduce the octet size of the end sequence number to 1 octet (e.g., not 2 or 3 octets for the X2-U sequence number size) and can effectively report up to 256 consecutive lost X2-U packets from the start sequence number. Depending on the number of consecutive X2-U packets lost, in embodiments, the secondary node may compile the report as follows. If the consecutive number of missing packets is less than 256, then the secondary node may compile a report of Type 2 (e.g., see Table 3) If the number is more than 256, then it compiles the report as legacy (e.g., denoted by Type 1 in Table 3) by indicating a range from start to end sequence numbers. For each gap (smaller than 257) of consecutive X2-U packets lost when the secondary node is reporting, for each report, the system can save 1 octet compared to using the legacy mechanism.

In the embodiments described above, the master node (MN) is generally referred to as the node sending packets and receiving feedback from the secondary node (SN), which is true for downlink in DC. It is to be understood that the described enhancements may also be applicable to both uplink (UL) operations, in which case the roles of the MN and the SN are reversed, and to F1 operation. In F1 operation, the CU sends downlink packets and receives feedback from the DU, and the DU sends uplink packets and receives feedback from the CU.

Figure 5:
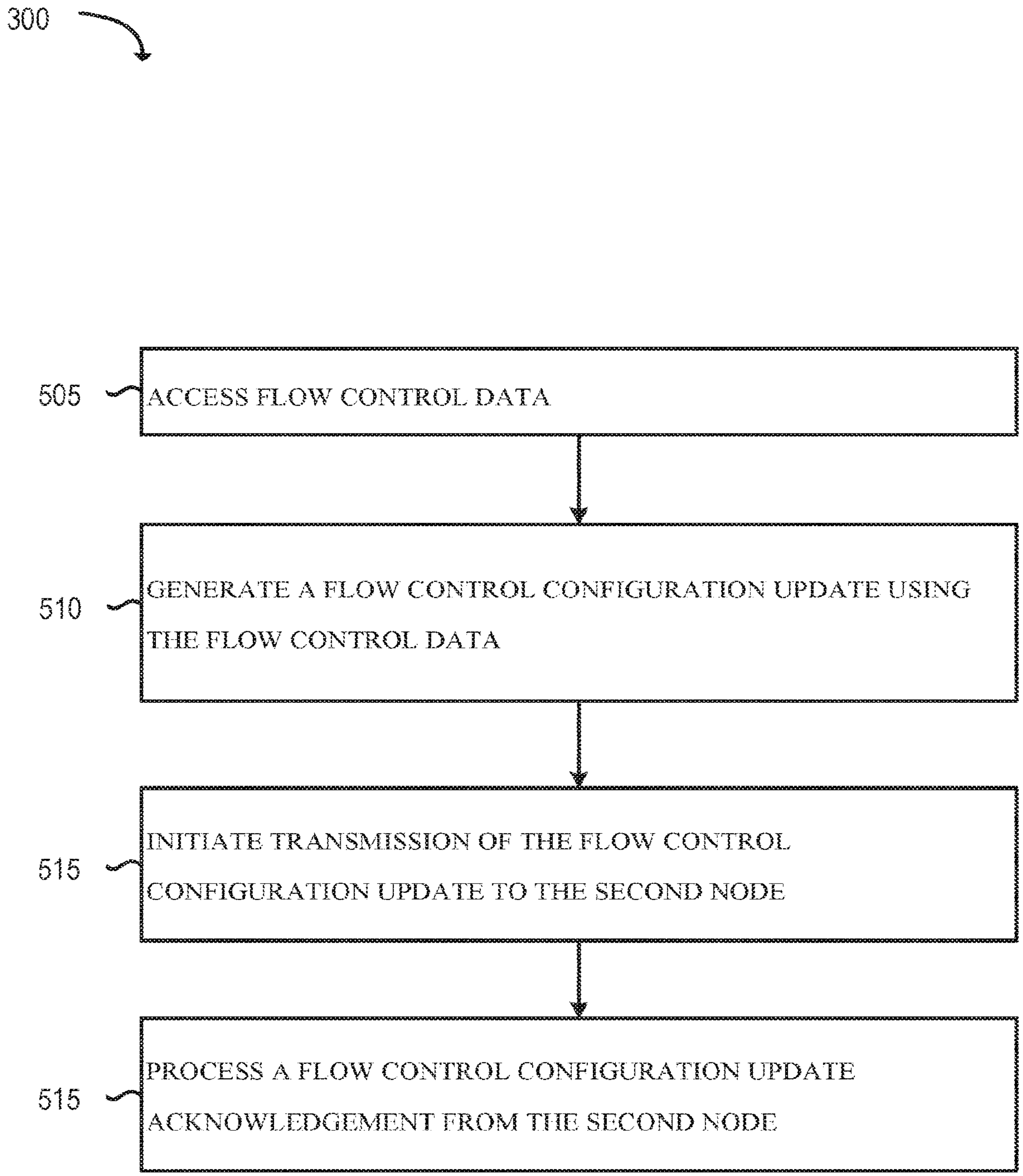
FIG. 5 describes a method performed by an apparatus of a node in accordance with some embodiments.

FIG. 5 illustrates an example method 500 performed by an apparatus of a node (e.g., a next-generation node B (gNB), evolved node B (eNB), or any such apparatus of a communication node) in accordance with the embodiments described herein (e.g., MN 210 or 410 or SN 220 or 420). In some embodiments, the method 500 of FIG. 5 may be implemented by one or more processors of a device or an apparatus of any machine used to implement a node that includes processing circuitry. In other embodiments, the method 500 may be implemented as computer-readable instructions in a storage medium that, when executed by one or more processors of a device, cause the device to perform the method 500. In some embodiments, the associated devices may be part of an NG-Radio Access Network (NG-RAN) node, with the associated device or apparatus within the NG-RAN comprising components such as processing circuitry, memory, interfaces, transmission circuitry, or other such circuit elements. In some embodiments, the operations of method 500 are preceded by the operations of method 300. In other embodiments, method 500 operate independently without the operations of method 300. In still further embodiments, various combinations of any operations described herein may be used with either the operations of method 500 and/or the operations of method 300. Some embodiments are implemented by an NR node where the NR node comprises a node hosting NR packet data convergence protocol (PDCP) operations, and a second node comprises a corresponding node.

Method 500 includes operation 305 to access flow control data. In operation 310, the access flow control data is used to generate a flow control configuration update using the flow control data, and in operation 315, transmission of the flow control configuration update to the second node is initiated. The flow control configuration is then received and processed at the an update acknowledgement message which is sent to the NR node. In operation 320 a DL data delivery status message is processed. In some embodiments, the flow control data comprises a report polling parameter. In still further embodiments, this report polling parameter indicates that the NR node hosting the NR PDCP operations requests a downlink delivery status report.

The methods describe particular embodiments, but it will be apparent that additional methods, in accordance with the embodiments described herein, are possible with repeated or intervening operations. For example, various embodiments of operations at a RAN, a gNB, a network device, and a UE are described above, and it will be apparent that corresponding operations at elements of a communication network other than those specifically described (e.g., operations at a gNB, UE, or core network device associated with described operations for another corresponding device) will occur in conjunction with the described operations. Further still, any embodiments described above may be performed with repeated operations or intervening operations in various different embodiments. Any of these operations may additionally involve generation or processing of communications, information elements, and/or fields described above in addition to the particular communications, information elements, and fields of the above methods. An additional set of non-exhaustive embodiments is further presented below.

EXAMPLE EMBODIMENTS

Example 1 may include a master node (MN) comprising: means for determining or causing to determine a signal to send to a secondary node (SN): means for transmitting or causing to transmit the determined signal; means for identifying or causing to identify a received signal from a secondary node (SN); and means for processing or causing to process the received signal.

Example 2 may include the subject matter of example 1, or of any other example herein, wherein means for determining or causing to determine a signal to send to an SN includes means for determining or causing to determine packets or flow control to send to the SN.

Example 3 may include the subject matter of example 2, or of any other example herein, wherein means for determining or causing to determine packets further includes means for determining or causing to determine packet data convergence protocol (PDCP) or protocol data unit (PDU).

Example 4 may include the subject matter of example 1, or of any other example herein, wherein means for identifying or causing to identify a received signal from a SN further includes means for identifying or causing to identify feedback from the SN.

Example 5 may include the subject matter of example 1, or of any other example herein, wherein means for processing or causing to process the received signal further includes means for processing or causing to process flow control toward the MN.

Example 6 may include the subject matter of example 1, or of any other example herein, wherein the MN, SN, or another node or entity in communication with the MN or SN are interconnected by an interface.

Example 7 may include the subject matter of example 6, or of any other example herein, wherein the interface includes X2, Xn, or F1.

Example 8 may include the subject matter of example 7, or of any other example herein, wherein the user-plane entity for the interface supports DATA FRAME structure for transferring uplink packets toward a peer entity of the interface.

Example 9 may include the subject matter of example 8, or of any other example herein, wherein the user-plane entity for the interface is further to provide feedback of downlink or uplink packets received toward the peer entity of the interface for flow control by the peer entity.

Example 10 may include the subject matter of example 8, or of any other example herein, wherein the user-plane entity support for the DATA FRAME structure is further to include means for transferring or causing to transfer a highest successfully delivered PDCP sequence number for downlink or a highest successfully received PDCP sequence number for uplink for redundant transmission avoidance by the peer entity when PDCP duplication is configured.

Example 11 may include a secondary node (SN) comprising: means for determining or causing to determine a signal to send to a master node (MN); means for transmitting or causing to transmit the determined signal; means for identifying or causing to identify a received signal from a master node (MN); and means for processing or causing to process the received signal.

Example 12 may include the subject matter of example 11, or of any other example herein, wherein means for determining or causing to determine a signal to send to an MN includes means for determining or causing to determine packets or flow control to send to the MN.

Example 13 may include the subject matter of example 12, or of any other example herein, wherein means for determining or causing to determine packets further includes means for determining or causing to determine packet data convergence protocol (PDCP) or protocol data unit (PDU).

Example 14 may include the subject matter of example 11, or of any other example herein, wherein means for identifying or causing to identify a received signal from a MN further includes means for identifying or causing to identify feedback from the MN.

Example 15 may include the subject matter of example 11, or of any other example herein, wherein means for processing or causing to process the received signal further includes means for processing or causing to process flow control toward the SN.

Example 16 may include the subject matter of example 11, or of any other example herein, wherein the MN, SN, or another node or entity in communication with the SN or MN are interconnected by an interface.

Example 17 may include the subject matter of example 16, or of any other example herein, wherein the interface includes X2, Xn, or F1.

Example 18 may include the subject matter of example 17, or of any other example herein, wherein the user-plane entity for the interface support DATA FRAME structure for transferring downlink and uplink packets toward a peer entity of the interface.

Example 19 may include the subject matter of example 18, or of any other example herein, further including means for providing or causing to provide feedback of downlink and uplink packets received toward the peer entity of the interface for flow control by the peer entity.

Example 20 may include the subject matter of example 19, or of any other example herein, wherein the user-plane entity support for the DATA FRAME structure is further to include means for transferring or causing to transfer a highest successfully delivered PDCP sequence number for downlink or a highest successfully received PDCP sequence number for uplink for redundant transmission avoidance by the peer entity when PDCP duplication is configured.

Example 21 may include radio access system network where the node or entities are interconnected by the interface (such as X2, Xn, or F1). The system at least includes a master node (MN) and a secondary node (SN), where the MN sends packets (e.g. PDCP PDU) and receiving feedback from the SN, and performs flow control toward the SN (or vice versa)

Example 22 may include the MN of example 21 or some other example herein, wherein the user-plane entity for the said interface support DATA FRAME structure for transferring uplink packets toward the peer entity of the said interface: and for providing feedback of downlink (e.g. in case of SCG split bearer) and uplink packets received toward the peer entity of the said interface for flow control by the peer entity.

Example 23 may include the SN of example 21 or some other example herein, wherein the user-plane entity for the said interface support DATA FRAME structure for transferring downlink (e.g. in case of SCG split bearer) and uplink packets toward the peer entity of the said interface; and for providing feedback of downlink and uplink packets received toward the peer entity of the said interface for flow control by the peer entity.

Example 24 may include the MN or SN of example 21 or some other example herein, wherein the user-plane entity for the said interface support DATA FRAME structure for transferring highest successfully delivered PDCP sequence number for downlink and highest successfully received PDCP sequence number for uplink toward the peer entity of the said interface for redundant transmission avoidance by the peer entity in case of PDCP duplication configured Example 25 may be a master node (MN) to: determine or cause to determine a signal to send to a secondary node (SN); transmit or cause to transmit the determined signal; identify or cause to identify a received signal from a secondary node (SN): and process or cause to process the received signal.

Example 26 may include the subject matter of example 25, or of any other example herein, wherein determine or cause to determine a signal to send to an SN includes determine or cause to determine packets or flow control to send to the SN.

Example 27 may include the subject matter of example 26, or of any other example herein, wherein determine or cause to determine packets further includes determine or cause to determine packet data convergence protocol (PDCP) or protocol data unit (PDU).

Example 28 may include the subject matter of example 25, or of any other example herein, wherein identify or cause to identify a received signal from a SN further includes identify or cause to identify feedback from the SN.

Example 29 may include the subject matter of example 25, or of any other example herein, wherein process or cause to process the received signal further includes process or cause to process flow control toward the MN.

Example 30 may include the subject matter of example 25, or of any other example herein, wherein the MN, SN, or another node or entity in communication with the MN or SN are interconnected by an interface.

Example 31 may include the subject matter of example 30, or of any other example herein, wherein the interface includes X2, Xn, or F1.

Example 32 may include the subject matter of example 31, or of any other example herein, wherein the user-plane entity for the interface supports DATA FRAME structure for transferring uplink packets toward a peer entity of the interface.

Example 33 may include the subject matter of example 32, or of any other example herein, wherein the user-plane entity for the interface is further to provide feedback of downlink or uplink packets received toward the peer entity of the interface for flow control by the peer entity.

Example 34 may include the subject matter of example 32, or of any other example herein, wherein the user-plane entity support for the DATA FRAME structure is further to include transfer or cause to transfer a highest successfully delivered PDCP sequence number for downlink or a highest successfully received PDCP sequence number for uplink for redundant transmission avoidance by the peer entity when it PDCP duplication is configured.

Example 35 may include a secondary node (SN) to: determine or cause to determine a signal to send to a master node (MN); transmit or cause to transmit the determined signal; identify or cause to identify a received signal from a master node (MN): and process or cause to process the received signal.

Example 36 may include the subject matter of example 35, or of any other example herein, wherein determine or cause to determine a signal to send to an MN includes determining or causing to determine packets or flow control to send to the MN.

Example 37 may include the subject matter of example 36, or of any other example herein, wherein determine or cause to determine packets further includes determine or cause to determine packet data convergence protocol (PDCP) or protocol data unit (PDU).

Example 38 may include the subject matter of example 35, or of any other example herein, wherein identify or cause to identify a received signal from a MN further includes identify or cause to identify feedback from the MN.

Example 39 may include the subject matter of example 35, or of any other example herein, wherein process or cause to process the received signal further includes process or cause Example 40 may include the subject matter of example 35, or of any other example herein, wherein the MN, SN, or another node or entity in communication with the SN or MN are interconnected by an interface.

Example 41 may include the subject matter of example 40, or of any other example herein, wherein the interface includes X2, Xn, or F1.

Example 42 may include the subject matter of example 41, or of any other example herein, wherein the user-plane entity for the interface support DATA FRAME structure for transferring downlink and uplink packets toward a peer entity of the interface.

Example 43 may include the subject matter of example 42, or of any other example herein, further including provider cause to provide feedback of downlink and uplink packets received toward the peer entity of the interface for flow control by the peer entity.

Example 44 may include the subject matter of example 43, or of any other example herein, wherein the user-plane entity support for the DATA FRAME structure is further to include transfer or cause to transfer a highest successfully delivered PDCP sequence number for downlink or a highest successfully received PDCP sequence number for uplink for redundant transmission avoidance by the peer entity when PDCP duplication is configured.

Example 45 may include a method for implementing a master node (MN) comprising: determining or causing to determine a signal to send to a secondary node (SN); transmitting or causing to transmit the determined signal; identifying or causing to identify a received signal from a secondary node (SN); and processing or causing to process the received signal.

Example 46 may include the subject matter of example 45, or of any other example herein, wherein determining or causing to determine a signal to send to an SN includes determining or causing to determine packets or flow control to send to the SN.

Example 47 may include the subject matter of example 46, or of any other example herein, wherein determining or causing to determine packets further includes determining or causing to determine packet data convergence protocol (PDCP) or protocol data unit (PDU).

Example 48 may include the subject matter of example 45, or of any other example herein, wherein identifying or causing to identify a received signal from a SN further includes identifying or causing to identify feedback from the SN.

Example 49 may include the subject matter of example 45, or of any other example herein, wherein processing or causing to process the received signal further includes processing or causing to process flow control toward the MN.

Example 50 may include the subject matter of example 45, or of any other example herein, wherein the MN, SN, or another node or entity in communication with the MN or SN are interconnected by an interface.

Example 51 may include the subject matter of example 50, or of any other example herein, wherein the interface includes X2. Xn, or F1.

Example 52 may include the subject matter of example 51, or of any other example herein, wherein the user-plane entity for the interface supports DATA FRAME structure for transferring uplink packets toward a peer entity of the interface.

Example 53 may include the subject matter of example 52, or of any other example herein, wherein the user-plane entity for the interface is further to provide feedback of downlink or uplink packets received toward the peer entity of the interface for flow control by the peer entity.

Example 54 may include the subject matter of example 52, or of any other example herein, wherein the user-plane entity support for the DATA FRAME structure is further to include transferring or causing to transfer a highest successfully delivered PDCP sequence number for downlink or a highest successfully received PDCP sequence number for uplink for redundant transmission avoidance by the peer entity when PDCP duplication is configured.

Example 55 may include a method for implementing a secondary node (SN) comprising: determining or causing to determine a signal to send to a master node (MN); transmitting or causing to transmit the determined signal; identifying or causing to identify a received signal from a master node (MN); and processing or causing to process the received signal.

Example 56 may include the subject matter of example 55, or of any other example herein, wherein determining or causing to determine a signal to send to an MN includes determining or causing to determine packets or flow control to send to the MN.

Example 57 may include the subject matter of example 56, or of any other example herein, wherein determining or causing to determine packets further includes determining or causing to determine packet data convergence protocol (PDCP) or protocol data unit (PDU).

Example 58 may include the subject matter of example 55, or of any other example herein, wherein identifying or causing to identify a received signal from a MN further includes identifying or causing to identify feedback from the MN.

Example 59 may include the subject matter of example 55, or of any other example herein, wherein processing or causing to process the received signal further includes processing or causing to process flow control toward the SN.

Example 60 may include the subject matter of example 55, or of any other example herein, wherein the MN, SN, or another node or entity in communication with the SN or MN are interconnected by an interface.

Example 61 may include the subject matter of example 60, or of any other example herein, wherein the interface includes X2, Xn, or F1.

Example 62 may include the subject matter of example 61, or of any other example herein, wherein the user-plane entity for the interface support DATA FRAME structure for transferring downlink and uplink packets toward a peer entity of the interface.

Example 63 may include the subject matter of example 62, or of any other example herein, further including providing or causing to provide feedback of downlink and uplink packets received toward the peer entity of the interface for flow control by the peer entity.

Example 64 may include the subject matter of example 63, or of any other example herein, wherein the user-plane entity support for the DATA FRAME structure is further to include transferring or causing to transfer a highest successfully delivered PDCP sequence number for downlink or a highest successfully received PDCP sequence number for uplink for redundant transmission avoidance by the peer entity when PDCP duplication is configured.

Example 65 may include an apparatus comprising means to perform one or more elements of a method described in or related to any of examples 1-64, or any other method or process described herein.

Example 66 may include one or more non-transitory computer-readable media comprising instructions to cause an electronic device, upon execution of the instructions by one or more processors of the electronic device, to perform one or more elements of a method described in or related to any of examples 1-64, or any other method or process described herein.

Example 67 may include an apparatus comprising logic, modules, or circuitry to perform one or more elements of a method described in or related to any of examples 1-64, or any other method or process described herein.

Example 68 may include a method, technique, or process as described in or related to any of examples 1-64, or portions or parts thereof.

Example 69 may include an apparatus comprising: one or more processors and one or more computer readable media comprising instructions that, when executed by the one or more processors, cause the one or more processors to perform the method, techniques, or process as described in or related to any of examples 1-64, or portions thereof.

Example 70 may include a signal as described in or related to any of examples 1-64, or portions or parts thereof.

Example 71 may include the radio access system network where the node or entities are interconnected by the interface (such as X2, Xn, or F1). The system at least includes a master node (MN) and a secondary node (SN), where the MN sends packets (e.g. PDCP PDU) and receiving feedback from the SN, and performs flow control toward the SN (or vice versa)

Example 72 may include the MN or SN of example 71 or some other example herein, wherein the user-plane entity for the said interface support DATA FRAME structure to trigger feedback report from the peer entity by polling.

Example 73 may include the MN or SN of example 71 or some other example herein, wherein the control-plane entity for the said interface support procedure and message structure to configure/update/release periodic or even-based report triggering over the user-plane for the said interface.

Example 74 may include the MN or SN of example 71 or some other example herein, wherein the user-plane entity for the said interface support DATA FRAME structure to provide feedback report to the peer entity according to triggering configured by the control-plane entity or when polled by the peer entity over the user-plane.

Example 75 may include the MN or SN of example 71 or some other example herein, wherein the user-plane entity for the said interface support DATA FRAME structure to request specific feedback (such as throughput, queueing delay. RLC delay, Buffer Status Report, etc.) to the peer entity for the accurate metric estimation and flow control.

Example 76 may include the MN or SN of example 71 or some other example herein, wherein the user-plane entity for the said interface support DATA FRAME structure to provide the requested feedback in the report to the peer entity for the flow control by the peer entity.

Example 77 may include the MN or SN of example 71 or some other example herein, wherein the user-plane entity for the said interface support DATA FRAME structure to provide the time offset information for the reported PDCP SN (e.g. highest successfully delivered PDCP SN to the UE) until the time carried by the report for the accurate metric estimation by the peer entity.

Example 78 may include the MN or SN of example 71 or some other example herein, wherein the user-plane entity for the said interface support DATA FRAME structure to provide the report of the missing packets status by the number of consecutive lost packets from the start SN to the peer entity Example 79 may include an apparatus comprising means to perform one or more elements of a method described in or related to any of examples 71-78, or any other method or process described herein.

Example 80 may include one or more non-transitory computer-readable media comprising instructions to cause an electronic device, upon execution of the instructions by one or more processors of the electronic device, to perform one or more elements of a method described in or related to any of examples 71-78, or any other method or process described herein.

Example 81 may include an apparatus comprising logic, modules, or circuitry to perform one or more elements of a method described in or related to any of examples 71-78, or any other method or process described herein.

Example 82 may include a method, technique, or process as described in or related to any of examples 71-78, or portions or parts thereof.

Example 83 may include an apparatus comprising, one or more processors and one or more computer readable media comprising instructions that, when executed by the one or more processors, cause the one or more processors to perform the method, techniques, or process as described in or related to any of examples 71-78, or portions thereof.

Example 84 may include a signal as described in or related to any of examples 71-78, or portions or parts thereof.

Example 85 may include a signal in a wireless network as shown and described herein.

Example 86 may include a method of communicating in a wireless network as shown and described herein.

Example 87 may include a system for providing wireless communication as shown and described herein.

Example 88 may include a device for providing wireless communication as shown and described herein.

Example 89 is an apparatus of a New Radio (NR) node configured for NR user-plane protocol communications between a master node (MN) and a secondary node (SN), the apparatus comprising: processing circuitry configured to: access downlink (DL) user data; generate a DL user data message with the DL user data: initiate transmission of the DL user data message to a second node; and process a DL data delivery status message from the second node in response to the DL user data message; and an interface coupled to the processing circuitry configured to communicate the DL user data message to the second node and receive the DL data delivery status message from the second node.

In Example 90, the subject matter of Example 89 optionally includes wherein the NR node comprises the SN and wherein the second node comprises the MN.

In Example 91, the subject matter of Example 90 optionally includes wherein the DL user data comprises a highest successfully delivered PDCP protocol data unit (PDU) sequence number.

In Example 92, the subject matter of Example 91 optionally includes wherein the DL user data message comprises a DL discard field based on the highest successfully delivered PDCP PDU sequence number indicating a sequence number up to and including which all NR PDCP PDUs should be discarded by the second node.

In Example 93, the subject matter of any one or more of Examples 89-92 optionally include wherein the NR node comprises a node hosting NR packet data convergence protocol (PDCP) operations, and the second node comprises a corresponding node.

In Example 94, the subject matter of Example 93 optionally includes wherein the processing circuitry is further configured to: access flow control data, generate a flow control configuration update using the flow control data; initiate transmission of the flow control configuration update to the second node; and process a flow control configuration update acknowledgement from the second node.

In Example 95, the subject matter of Example 94 optionally includes wherein the flow control data comprises a report polling parameter.

In Example 96, the subject matter of Example 95 optionally includes wherein the report polling parameter indicates that the NR node hosting the NR PDCP operations requests a downlink delivery status report.

In Example 97, the subject matter of any one or more of Examples 89-96 optionally include wherein the DL user data message comprises a first PDU type and the DL data delivery status message comprises a second PDU type.

In Example 98, the subject matter of Example 97 optionally includes wherein the DL data delivery status message comprises a parameter indicating a highest transmitted NR PDCP sequence number.

In Example 99, the subject matter of Example 98 optionally includes wherein the DL data delivery status message comprises a parameter indicating a transmitted status associated with the highest transmitted NR PDCP sequence number.

In Example 100, the subject matter of any one or more of Examples 97-99 optionally include wherein the DL data delivery status message comprises a parameter indicating a highest retransmitted NR PDCP sequence number.

In Example 101, the subject matter of Example 100 optionally includes wherein the DL data delivery status message comprises a parameter indicating a status associated with the highest retransmitted NR PDCP sequence number.

Example 102 is a computer readable storage medium comprising instructions that, when executed by one or more processors of a News Radio (NR) node configured for NR user-plane protocol communications between a master node (MN) and a secondary node (SN), cause the one or more processors to: access downlink (DL) user data; generate a DL user data message with the DL user data; initiate transmission of the DL user data message to a second node; and process a DL data delivery status message from the second node in response to the DL user data message.

In Example 103, the subject matter of Example 102 optionally includes wherein the NR node comprises the SN and wherein the second node comprises the MN.

In Example 104, the subject matter of Example 103 optionally includes wherein the DL user data comprises a highest successfully delivered PDCP protocol data unit (PDU) sequence number.

In Example 105, the subject matter of Example 104 optionally includes wherein the DL user data message comprises a DL discard field based on the highest successfully delivered PDCP PDU sequence number indicating a sequence number up to and including which all NR PDCP PDUs should be discarded by the second node.

In Example 106, the subject matter of any one or more of Examples 102-105 optionally include wherein the processing circuitry is further configured to: access flow control data: generate a flow control configuration update using the flow control data: initiate transmission of the flow control configuration update to the second node; and process a flow control configuration update acknowledgement from the second node.

In Example 107, the subject matter of Example 106 optionally includes wherein the flow control data comprises a report polling parameter, and wherein the report polling parameter indicates that the NR node hosting the NR PDCP operations requests a downlink delivery status report.

In Example 108, the subject matter of any one or more of Examples 102-107 optionally include wherein the DL user data message comprises a first PDU type and the DL data delivery status message comprises a second PDU type.

In Example 109, the subject matter of Example 108 optionally includes wherein the DL data delivery status message comprises a parameter indicating a highest transmitted NR PDCP sequence number; and wherein the DL data delivery status message comprises a parameter indicating a transmitted status associated with the highest transmitted NR PDCP sequence number.

In Example 110, the subject matter of any one or more of Examples 108-109 optionally include wherein the DL data delivery status message comprises a parameter indicating a highest retransmitted NR PDCP sequence number: and wherein the DL data delivery status message comprises a parameter indicating a status associated with the highest retransmitted NR PDCP sequence number.

Example 111 is a method performed by one or more processors of a New Radio (NR) node configured for NR user-plane protocol communications between a master node (MN) and a secondary node (SN), the method comprising: accessing downlink (DL) user data, generating a DL user data message with the DL user data; initiating transmission of the DL user data message to a second node: and processing a DL data delivery status message from the second node in response to the DL user data message.

In Example 112, the subject matter of Example 111 optionally includes wherein the NR node comprises the SN and wherein the second node comprises the MN.

In Example 113, the subject matter of Example 112 optionally includes wherein the DL user data comprises a highest successfully delivered PDCP protocol data unit (PDU) sequence number.

In Example 114, the subject matter of Example 113 optionally includes wherein the DL user data message comprises a DL discard field based on the highest successfully delivered PDCP PDU sequence number indicating a sequence number up to and including which all NR PDCP PDUs should be discarded by the second node.

In Example 115, the subject matter of any one or more of Examples 111-114 optionally include wherein the NR node comprises a node hosting NR packet data convergence protocol (PDCP) operations, and the second node comprises a corresponding node.

In Example 116, the subject matter of Example 115 optionally includes further comprising: accessing flow control data: generating a flow control configuration update using the flow control data: initiating transmission of the flow control configuration update to the second node, and processing a flow control configuration update acknowledgement from the second node.

In Example 117, the subject matter of Example 116 optionally includes wherein the flow control data comprises a report polling parameter.

In Example 118, the subject matter of Example 117 optionally includes wherein the report polling parameter indicates that the NR node hosting the NR PDCP operations requests a downlink delivery status report.

In Example 119, the subject matter of any one or more of Examples 111-118 optionally include embodiments wherein the DL user data message comprises a first PDU type and the DL data delivery status message comprises a second PDU type.

In Example 120, the subject matter of Example 119 optionally includes wherein the DL data delivery status message comprises a parameter indicating a highest transmitted NR PDCP sequence number.

In Example 121, the subject matter of Example 120 optionally includes wherein the DL data delivery status message comprises a parameter indicating a transmitted status associated with the highest transmitted NR PDCP sequence number.

In Example 122, the subject matter of any one or more of Examples 119-121 optionally include wherein the DL data delivery status message comprises a parameter indicating a highest retransmitted NR PDCP sequence number.

In Example 123, the subject matter of Example 122 optionally includes wherein the DL data delivery status message comprises a parameter indicating a status associated with the highest retransmitted NR PDCP sequence number.

Example 124 is an apparatus of a New Radio (NR) node configured as a secondary node (SN) for NR user-plane protocol communications with a master node (MN), the apparatus comprising: processing circuitry configured to: access downlink (UL) user data: generate an UL user data message with the UL user data; initiate transmission of the UL user data message to the MN: and process an UL data delivery status message from the MN in response to the UL user data message; and an interface coupled to the processing circuitry configured to communicate the UL user data message to the MN and receive the UL data delivery status message from the MN.

In Example 125, the subject matter of Example 124 optionally includes wherein the UL user data comprises a highest successfully delivered PDCP protocol data unit (PDU) sequence number.

In Example 126, the subject matter of Example 125 optionally includes wherein the UL user data message comprises a UL discard field based on the highest successfully delivered PDCP PDU sequence number indicating a sequence number up to and including which all NR PDCP PDUs should be discarded by the second node.

Example 127 is an apparatus of a New Radio (NR) node configured as a master node (MN) for NR user-plane protocol communications with a secondary node (SN), the apparatus comprising: processing circuitry configured to: access downlink (UL) user data; generate an UL user data message with the UL user data: initiate transmission of the UL user data message to the SN; and process an UL data delivery status message from the SN in response to the UL user data message, and an interface coupled to the processing circuitry configured to communicate the UL user data message to the SN and receive the UL data delivery status message from the SN.

In Example 128, the subject matter of any one or more of Examples 124-127 optionally include wherein the UL user data comprises a highest successfully delivered PDCP protocol data unit (PDU) sequence number.

In Example 129, the subject matter of any one or more of Examples 125-128 optionally include wherein the UL user data message comprises a UL discard field based on the highest successfully delivered PDCP PDU sequence number indicating a sequence number up to and including which all NR PDCP PDUs should be discarded by the second node.

In Example 130, the subject matter of any one or more of Examples 117-129 optionally include wherein the report polling parameter indicates that the NR node hosting the NR PDCP operations requests a downlink delivery status report.

In Example 131, the subject matter of any one or more of Examples 115-130 optionally include further comprising: means for accessing flow control data; means for generating a flow control configuration update using the flow control data: means for initiating transmission of the flow control configuration update to the second node; and means for processing a flow control configuration update acknowledgement from the second node.

In Example 132, the subject matter of any one or more of Examples 120-131 optionally include wherein the DL data delivery status message comprises a parameter indicating a transmitted status associated with the highest transmitted NR PDCP sequence number.

In Example 133, the subject matter of any one or more of Examples 111-132 optionally include wherein the DL user data message comprises a first PDU type and the DL data delivery status message comprises a second PDU type.

In Example 134, the subject matter of any one or more of Examples 113-133 optionally include wherein the DL user data message comprises a DL discard field based on the highest successfully delivered PDCP PDU sequence number indicating a sequence number up to and including which all NR PDCP PDUs should be discarded by the second node.

In Example 135, the subject matter of any one or more of Examples 111-134 optionally include wherein the NR node comprises the SN and wherein the second node comprises the MN.

In Example 136, the subject matter of any one or more of Examples 111-135 optionally include wherein the NR node comprises a node hosting NR packet data convergence protocol (PDCP) operations, and the second node comprises a corresponding node.

In Example 137, the subject matter of any one or more of Examples 135-136 optionally include wherein the DL user data comprises a highest successfully delivered PDCP protocol data unit (PDU) sequence number.

In Example 138, the subject matter of any one or more of Examples 122-137 optionally include wherein the DL data delivery status message comprises a parameter indicating a status associated with the highest retransmitted NR PDCP sequence number.

In Example 139, the subject matter of any one or more of Examples 133-138 optionally include wherein the DL data delivery status message comprises a parameter indicating a highest retransmitted NR PDCP sequence number.

Example 140 is an apparatus of a New Radio (NR) node configured for NR user-plane protocol communications between a master node (MN) and a secondary node (SN), the apparatus comprising: means for accessing downlink (DL) user data; means for generating a DL user data message with the DL user data, means for initiating transmission of the DL user data message to a second node; and means for processing a DL data delivery status message from the second node in response to the DL user data message.

In Example 141, the subject matter of any one or more of Examples 131-140 optionally include wherein the flow control data comprises a report polling parameter.

In Example 142, the subject matter of any one or more of Examples 133-141 optionally include wherein the DL data delivery status message comprises a parameter indicating a highest transmitted NR PDCP sequence number.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

In addition to the above example embodiments, any combination of operations or elements described above may be integrated into various embodiments described herein. Additionally, other example embodiments may include any examples described above with the individual operations or device elements repeated or ordered with intervening elements or operations in any functional order.

Figure 6:
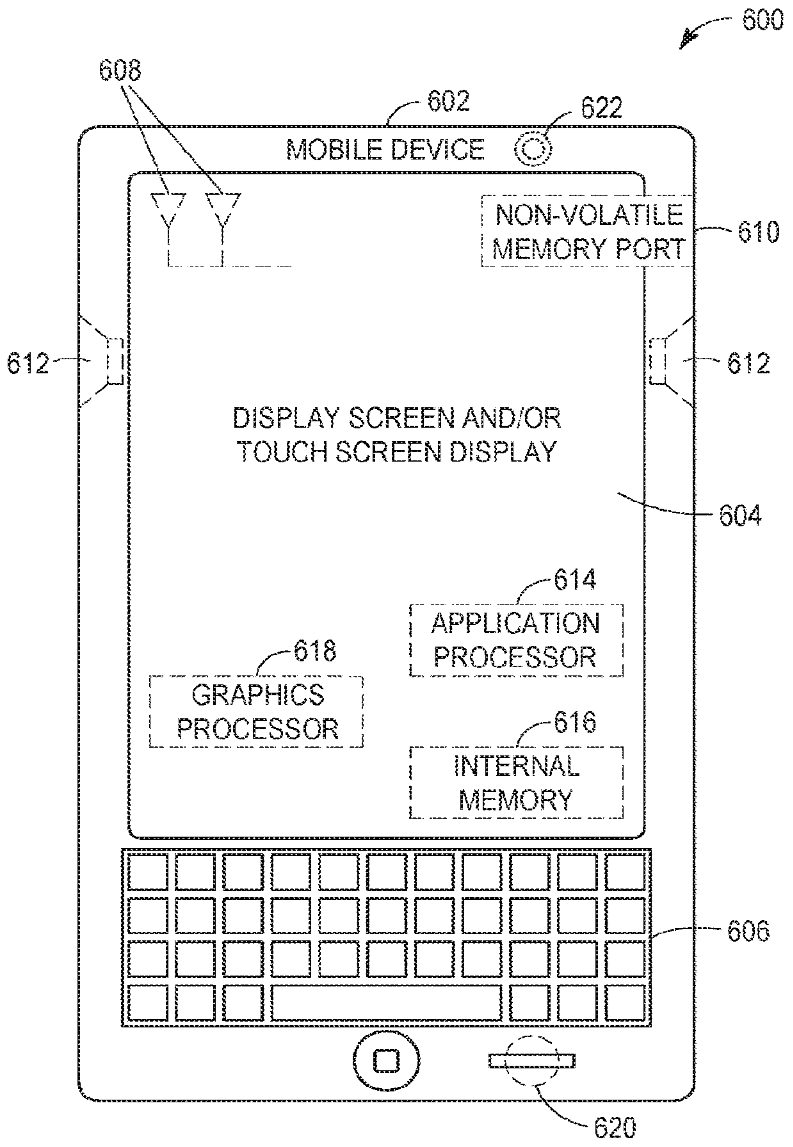
FIG. 6 illustrates an example UE, which may be configured for specialized operation or otherwise used with various embodiments described herein.

FIG. 6 shows an example UE 600. The UE 600 may be an implementation of the UEs 101, 102, or any other device described herein. The UE 600 can include one or more antennas 608 configured to communicate with a transmission station, such as a base station, an eNB/gNB, or another type of wireless wide area network (WWAN) access point. The UE 600 can communicate using separate antennas for each wireless communication standard or shared antennas for multiple wireless communication standards. The UE 600 can communicate in a wireless local area network (WLAN), a wireless personal area network (WPAN), and/or a WWAN.

FIG. 6 also shows a microphone 620 and one or more speakers 612 that can be used for audio input and output to and from the UE 600. As a headed device, the UE 600 includes one or more interfaces for a UI. The UE 600 particularly includes a display screen 604, which can be a liquid crystal display (LCD) screen or another type of display screen such as an organic light-emitting diode (OLED) display. The display screen 604 can be configured as a touch screen. The touch screen can use capacitive, resistive, or another type of touch-screen technology. An application processor 614 and a graphics processor 618 can be coupled to an internal memory 616 to provide processing and display capabilities. A non-volatile memory port 610 can also be used to provide data input/output (I/O) options to a user. The non-volatile memory port 610 can also be used to expand the memory capabilities of the UE 600. A keyboard 606 can be integrated with the UE 600 or wirelessly connected to the UE 600 to provide additional user input. A virtual keyboard can also be provided using the touch screen. A camera 622 located on the front (display screen 604) side or the rear side of the UE 600 can also be integrated into a housing 602 of the UE 600.

Figure 7:
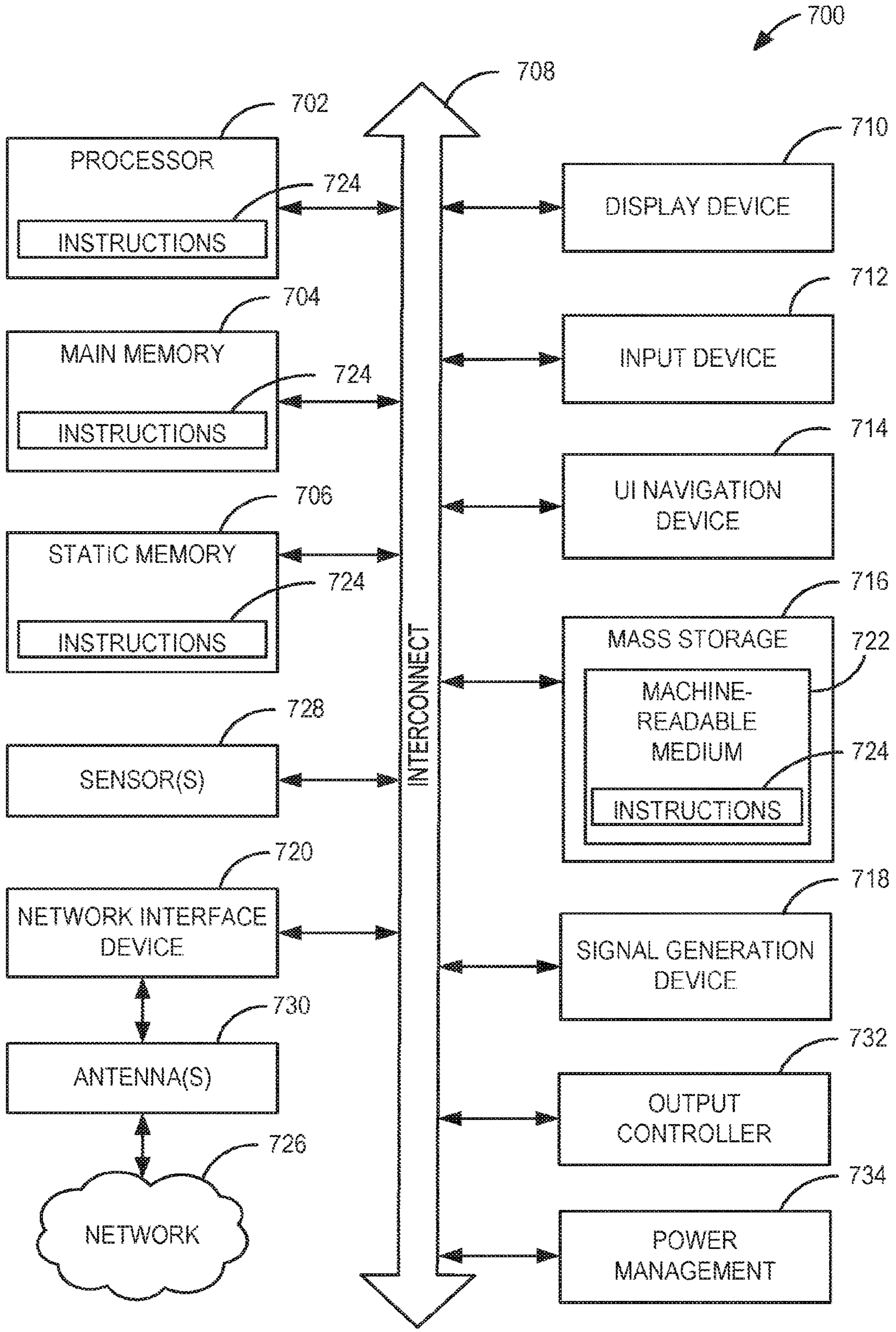
FIG. 7 is a block diagram illustrating an example computer system machine which may be used in association with various embodiments described herein.

FIG. 7 is a block diagram illustrating an example computer system machine 700 upon which any one or more of the methodologies herein discussed can be performed, and which may be used to implement the UEs 101, 102, or any other device described herein. In various alternative embodiments, the computer system machine 700 operates as a standalone device or can be connected (e.g., networked) to other machines. In a networked deployment, the computer system machine 700 can operate in the capacity of either a server or a client machine in server-client network environments, or it can act as a peer machine in peer-to-peer (or distributed) network environments. The computer system machine 700 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single computer system machine 700 is illustrated, the term "machine" shall also be taken to include any collection of machines that individually or jointly execute a set (or multiple sets) of instructions to perform any one or more of the methodologies discussed herein.

The example computer system machine 700 includes a processor 702 (e.g., a central processing unit (CPU), a graphics processing unit (GPU), or both), a main memory 704, and a static memory 706, which communicate with each other via an interconnect 708 (e.g., a link, a bus, etc.). The computer system machine 700 can further include a video display device 710, an alphanumeric input device 712 (e.g., a keyboard), and a user interface (UT) navigation device 714 (e.g., a mouse). In one embodiment, the video display device 710, alphanumeric input device 712, and UI navigation device 714 are a touch-screen display. The computer system machine 700 can additionally include a mass storage device 716 (e.g., a drive unit), a signal generation device 718 (e.g., a speaker), an output controller 732, a power management controller 734, a network interface device 720 (which can include or operably communicate with one or more antennas 730, transceivers, or other wireless communications hardware), and one or more sensors 728, such as a Global Positioning System (GPS) sensor, compass, location sensor, accelerometer, or other sensor.

The mass storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, the static memory 706, and/or the processor 702 during execution thereof by the computer system machine 700, with the main memory 704, the static memory 706, and the processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions (e.g., the instructions 724) for execution by the machine and that cause the machine to perform any one or more of the methodologies of the present disclosure, or that is capable of storing, encoding, or carrying data structures utilized by or associated with such instructions.

The instructions 724 can further be transmitted or received over a communications network 726 using a transmission medium via the network interface device 720 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (e.g., the instructions 724) embodied in tangible media, such as floppy diskettes, CD-ROMs, hard drives, non-transitory computer-readable storage media, or any other machine-readable storage medium wherein, when the program code is loaded into and executed by a machine, such as a computer, the machine becomes an apparatus for practicing the various techniques. In the case of program code execution on programmable computers, the computer may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The base station and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Figure 8:
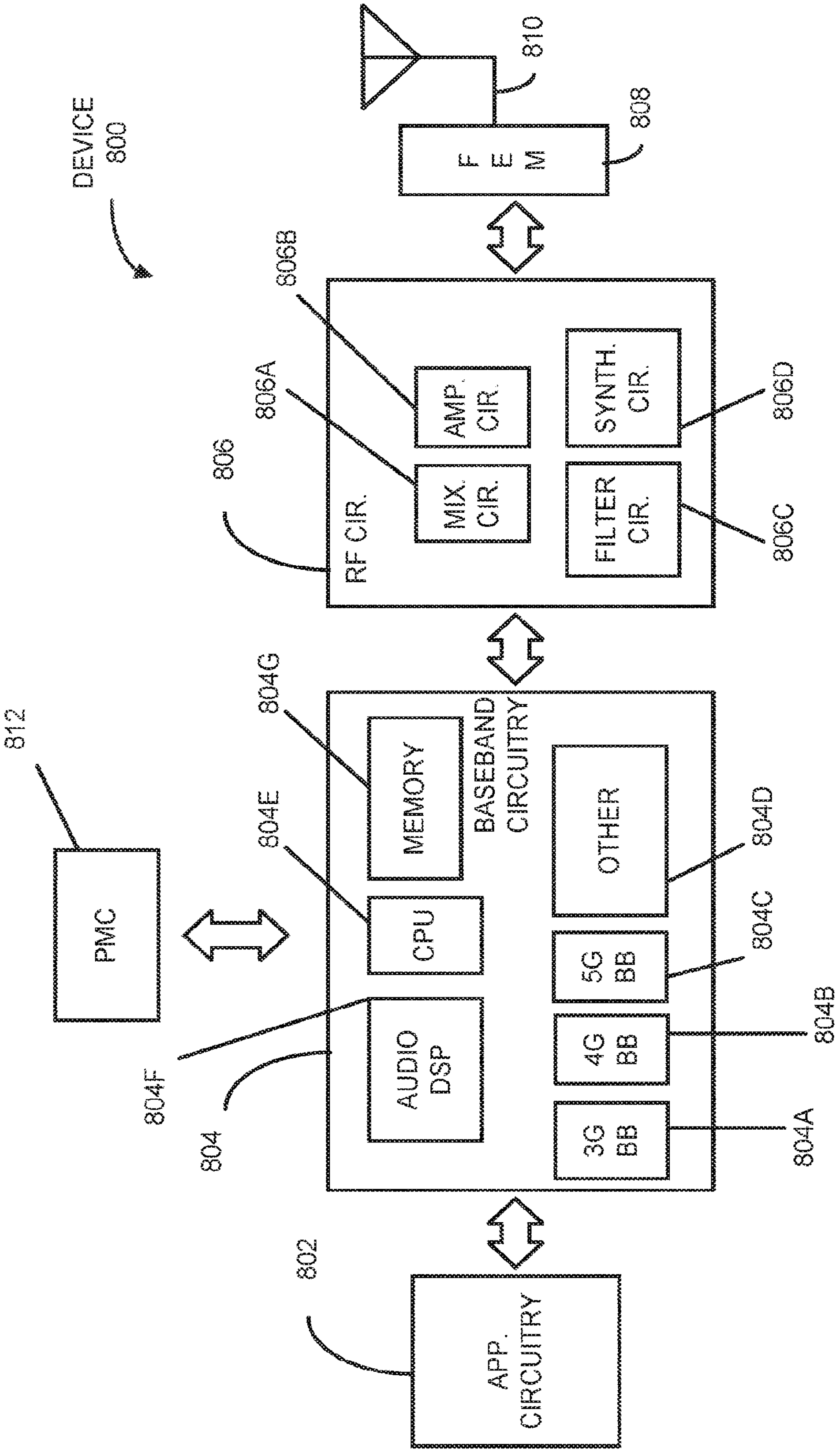
FIG. 8 illustrates aspects of a UE, a wireless apparatus, or a device, in accordance with some example embodiments.

FIG. 8 illustrates example components of a device 800 in accordance with some embodiments In some embodiments, the device 800 may include application circuitry 802, baseband circuitry 804. Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include fewer elements (e.g., a RAN node may not utilize the application circuitry 802, and instead include a processor/controller to process IP data received from an EPC). In some embodiments, the device 800 may include additional elements such as, for example, memory/storage, a display, a camera, a sensor, or an input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of the application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. The baseband circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development, or generations to be developed in the future (e.g., second generation (2G), sixth generation (6G), etc.). The baseband circuitry 804 (e.g., one or more of the baseband processors 804A-D) may handle various radio control functions that enable communication with one or more radio networks via the RF circuitry 806. In other embodiments, some or all of the functionality of the baseband processors 804A-D may be included in modules stored in a memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo. Viterbi, or Low-Density Panty Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP(s)) 804F. The audio DSP(s) 804F may be or include elements for compression/decompression and echo cancellation, and may include other suitable processing elements in other embodiments. Components of the baseband circuitry 804 may be suitably combined in a single chip or a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMANs), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers. etc. to facilitate the communication with the wireless network. The RF circuitry 806 may include a receive signal path which may include circuitry to down-convert RF signals received from the FEM circuitry 808 and provide baseband signals to the baseband circuitry 804. The RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806*a*, amplifier circuitry 806*b*, and filter circuitry 806*c*. In some embodiments, the transmit signal path of the RF circuitry 806 may include the filter circuitry 806*c* and the mixer circuitry 806*a*. The RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by the synthesizer circuitry 806_d_. The amplifier circuitry 806_b_ may be configured to amplify the down-converted signals, and the filter circuitry 806_c_ may be a low-pass filter (LPF) or band-pass filter (BPF) configured to remove unwanted signals from the down-converted signals to generate output baseband signals. Output baseband signals may be provided to the baseband circuitry 804 for further processing In some embodiments, the output baseband signals may be zero-frequency baseband signals, although this is not a requirement. In some embodiments, the mixer circuitry 806_a_ of the receive signal path may comprise passive mixers, although the scope of the embodiments is not limited in this respect.

In some embodiments, the mixer circuitry 806_a_ of the transmit signal path may be configured to up-convert input baseband signals based on the synthesized frequency provided by the synthesizer circuitry 806_d_ to generate RF output signals for the FEM circuitry 808. The baseband signals may be provided by the baseband circuitry 804 and may be filtered by the filter circuitry 806_c_.

In some embodiments, the mixer circuitry 806_a_ of the receive signal path and the mixer circuitry 806_a_ of the transmit signal path may include two or more mixers and may be arranged for quadrature downconversion and upconversion, respectively. In some embodiments, the mixer circuitry 806_a_ of the receive signal path and the mixer circuitry 806_a_ of the transmit signal path may include two or more mixers and may be arranged for image rejection (e.g., Hartley image rejection). In some embodiments, the mixer circuitry 806_a_ of the receive signal path and the mixer circuitry 806_a_ of the transmit signal path may be arranged for direct downconversion and direct upconversion, respectively. In some embodiments, the mixer circuitry 806_a_ of the receive signal path and the mixer circuitry 806_a_ of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 806 may include analog-to-digital converter (ADC) and digital-to-analog converter (DAC) circuitry, and the baseband circuitry 804 may include a digital baseband interface to communicate with the RF circuitry 806.

In some dual-mode embodiments, separate radio integrated circuitry (IC) circuitry may be provided for processing signals for each spectrum, although the scope of the embodiments is not limited in this respect.

In some embodiments, the synthesizer circuitry 806_d_ may be a fractional-N synthesizer or a fractional N/N+1 synthesizer, although the scope of the embodiments is not limited in this respect, as other types of frequency synthesizers may be suitable. For example, the synthesizer circuitry 806_d_ may be a delta-sigma synthesizer, a frequency multiplier, or a synthesizer comprising a phase-locked loop with a frequency divider.

The synthesizer circuitry 806_d_ may be configured to synthesize an output frequency for use by the mixer circuitry 806_a_ of the RF circuitry 806 based on a frequency input and a divider control input. In some embodiments, the synthesizer circuitry 806_d_ may be a fractional N/N+1 synthesizer.

In some embodiments, frequency input may be provided by a voltage-controlled oscillator (VCO), although that is not a requirement Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

The synthesizer circuitry 806_d_ of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLI, may include a set of cascaded, tunable delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 806_d_ may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (e.g., fLO). In some embodiments, the RF circuitry 806 may include an IQ/polar converter.

The FEM circuitry 808 may include a receive signal path which may include circuitry configured to operate on RF signals received from the one or more antennas 810, amplify the received signals, and provide the amplified versions of the received signals to the RF circuitry 806 for further processing. The FEM circuitry 808 may also include a transmit signal path which may include circuitry configured to amplify signals provided by the RF circuitry 806 for transmission by one or more of the one or more antennas 810. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806) The transmit signal path of the FEM circuitry 808 may include a power amplifier (PA) to amplify input RF signals (e.g., provided by the RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device 800 is included in a UE. The PMC 812 may increase the power conversion efficiency while providing desirable implementation size and heat dissipation characteristics.

FIG. 8 shows the PMC 812 coupled only with the baseband circuitry 804. However, in other embodiments, the PMC 812 may be additionally or alternatively coupled with, and perform similar power management operations for, other components, such as, but not limited to, the application circuitry 802, RF circuitry 806, or FEM circuitry 808.

In some embodiments, the PMC 812 may control, or otherwise be part of, various power-saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low-power state and it performs paging where it periodically wakes up to listen to the network and then powers down again. The device 800 may not receive data in this state; in order to receive data, it transitions back to the RRC_Connected state.

An additional power-saving mode may allow the device 800 to be unavailable to the network for periods longer than a paging interval (ranging from seconds to a few hours). During this time, the device 800 is totally unreachable by the network and may power down completely. Any data sent during this time incurs a large delay, and it is assumed that the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein. Layer 3 may comprise a radio resource control (RRC) layer, described in further detail below. As referred to herein layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
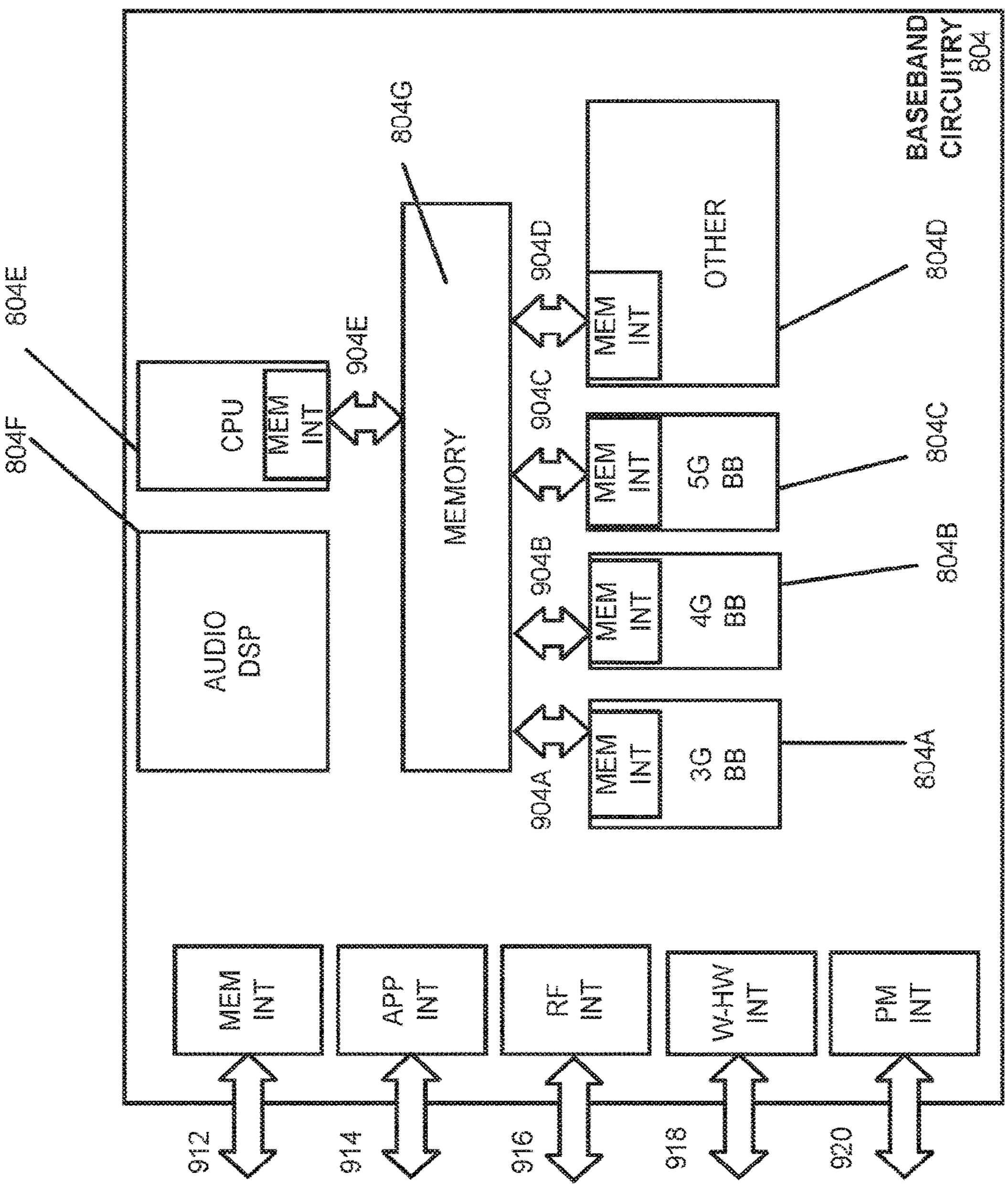
FIG. 9 illustrates example interfaces of baseband circuitry in accordance with some embodiments.

FIG. 9 illustrates example interfaces of the baseband circuitry 804 in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from the RF circuitry 806 of FIG. 8), a wireless hardware connectivity interface 918 (e.g., an interface to send/receive data to/from Near Field Communication (NFC) components, Bluetooth®, components (e.g., Bluetooth®, Low Energy), Wi-Fi® components, and other communication components), and a power management interface 920 (e.g., an interface to send/receive power or control signals to/from the PMC 812).

Figure 10:
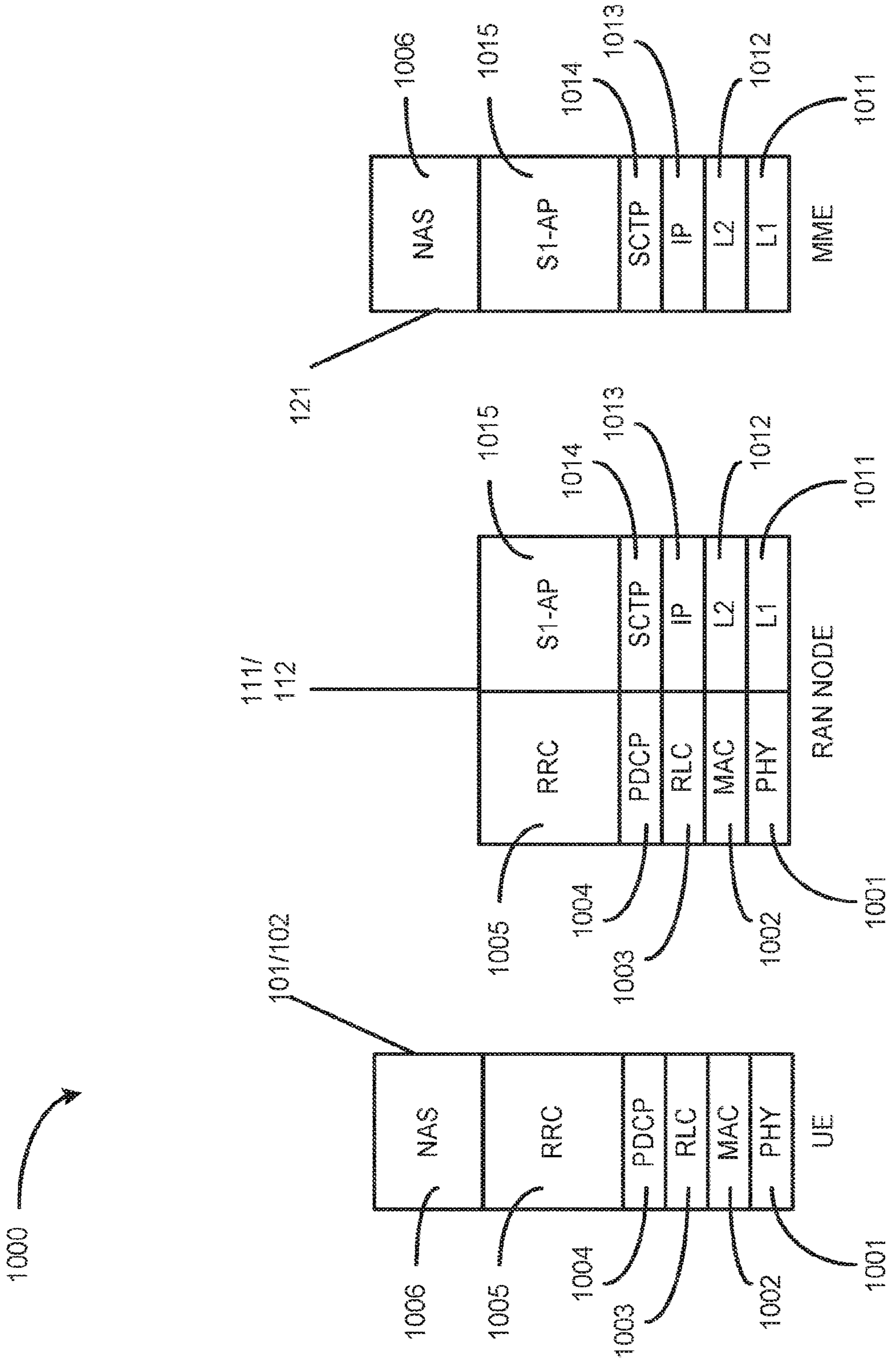
FIG. 10 is an illustration of a control-plane protocol stack in accordance with some embodiments.

FIG. 10 is an illustration of a control-plane protocol stack in accordance with some embodiments. In this embodiment, a control plane 1000 is shown as a communications protocol stack between the UE 101 (or alternatively, the UE 102), the macro RAN node 11 (or alternatively, the LP RAN node 112), and the MME 121.

A PHY layer 1001 may transmit or receive information used by a MAC layer 1002 over one or more air interfaces. The PHY layer 1001 may further perform link adaptation or adaptive modulation and coding (AMC), power control, cell search (e.g., for initial synchronization and handover purposes), and other measurements used by higher layers, such as an RRC layer 1005. The PHY layer 1001 may still further perform error detection on the transport channels, forward error correction (FEC) coding/decoding of the transport channels, modulation/demodulation of physical channels, interleaving, rate matching, mapping onto physical channels, and Multiple-Input Multiple-Output (MIMO) antenna processing.

The MAC layer 1002 may perform mapping between logical channels and transport channels, multiplexing of MAC service data units (SDUs) from one or more logical channels onto transport blocks (TBs) to be delivered to the PHY layer 1001 via transport channels, de-multiplexing of MAC SDUs to one or more logical channels from transport blocks (TBs) delivered from the PHY layer 1001 via transport channels, multiplexing of MAC SDUs onto TBs, scheduling information reporting, error correction through hybrid automatic repeat request (HARQ), and logical channel prioritization.

An RLC layer 1003 may operate in a plurality of modes of operation, including Transparent Mode (TM), Unacknowledged Mode (UM), and Acknowledged Mode (AM). The RLC layer 1003 may execute transfer of upper-layer protocol data units (PDUs), error correction through automatic repeat request (ARQ) for AM data transfers, and concatenation, segmentation, and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1004 may execute header compression and decompression of IP data, maintain PDCP Sequence Numbers (SNs), perform in-sequence delivery of upper-layer PDUs at the re-establishment of lower layers, eliminate duplicates of lower-layer SDUs at the re-establishment of lower layers for radio bearers mapped on RLC AM, cipher and decipher control-plane data, perform integrity protection and integrity verification of control-plane data, control timer-based discard of data, and perform security operations (e.g., ciphering, deciphering, integrity protection, integrity verification, etc.).

The main services and functions of the RRC layer 1005 may include broadcast of system information (e.g., included in Master Information Blocks (MIBs) or System Information Blocks (SIBs)) related to the non-access stratum (NAS); broadcast of system information related to the access stratum (AS); paging, establishment, maintenance, and release of an RRC connection between the UE and E-UTRAN (e.g., RRC connection paging. RRC connection establishment, RRC connection modification, and RRC connection release); establishment, configuration, maintenance, and release of point-to-point Radio Bearers; security functions including key management; inter-radio access technology (RAT) mobility; and measurement configuration for UE measurement reporting. Said MIBs and SIBs may comprise one or more information elements (IEs), which may each comprise individual data fields or data structures.

The UE 101 and the macro RAN node 111 may utilize a Uu interface (e.g., an LTE-Uu interface) to exchange control-plane data via a protocol stack comprising the PHY layer 1001, the MAC layer 1002, the RLC layer 1003, the PDCP layer 1004, and the RRC layer 1005.

Non-access stratum (NAS) protocols 1006 form the highest stratum of the control plane 1000 between the UE 101 and the MME 121. The NAS protocols 1006 support the mobility of the UE 101 and the session management procedures to establish and maintain IP connectivity between the UE 101 and the P-GW 123.

An S1 Application Protocol (S1-AP) layer 1015 may support the functions of the S1 interface and comprise Elementary Procedures (EPs). An EP is a unit of interaction between the macro RAN node 111 and the CN 120. The S1-AP layer 1015 services may comprise two groups: UE-associated services and non-UE-associated services. These services perform functions including, but not limited to, E-UTRAN Radio Access Bearer (E-RAB) management. UE capability indication, mobility, NAS signaling transport, RAN Information Management (RIM), and configuration transfer.

A Stream Control Transmission Protocol (SCTP) layer (alternatively referred to as an SCTP/IP layer) 1014 may ensure reliable delivery of signaling messages between the macro RAN node 111 and the MME 121 based, in part, on the IP protocol, supported by an IP layer 1013. An L2 layer 1012 and an L1 layer 1011 may refer to communication links (e.g., wired or wireless) used by the macro RAN node 111 and the MME 121 to exchange information.

The macro RAN node 111 and the MME 121 may utilize an S1-MME interface to exchange control-plane data via a protocol stack comprising the L1 layer 1011, the L2 layer 1012, the IP layer 1013, the SCTP layer 1014, and the S1-AP layer 1015.

Figure 11:
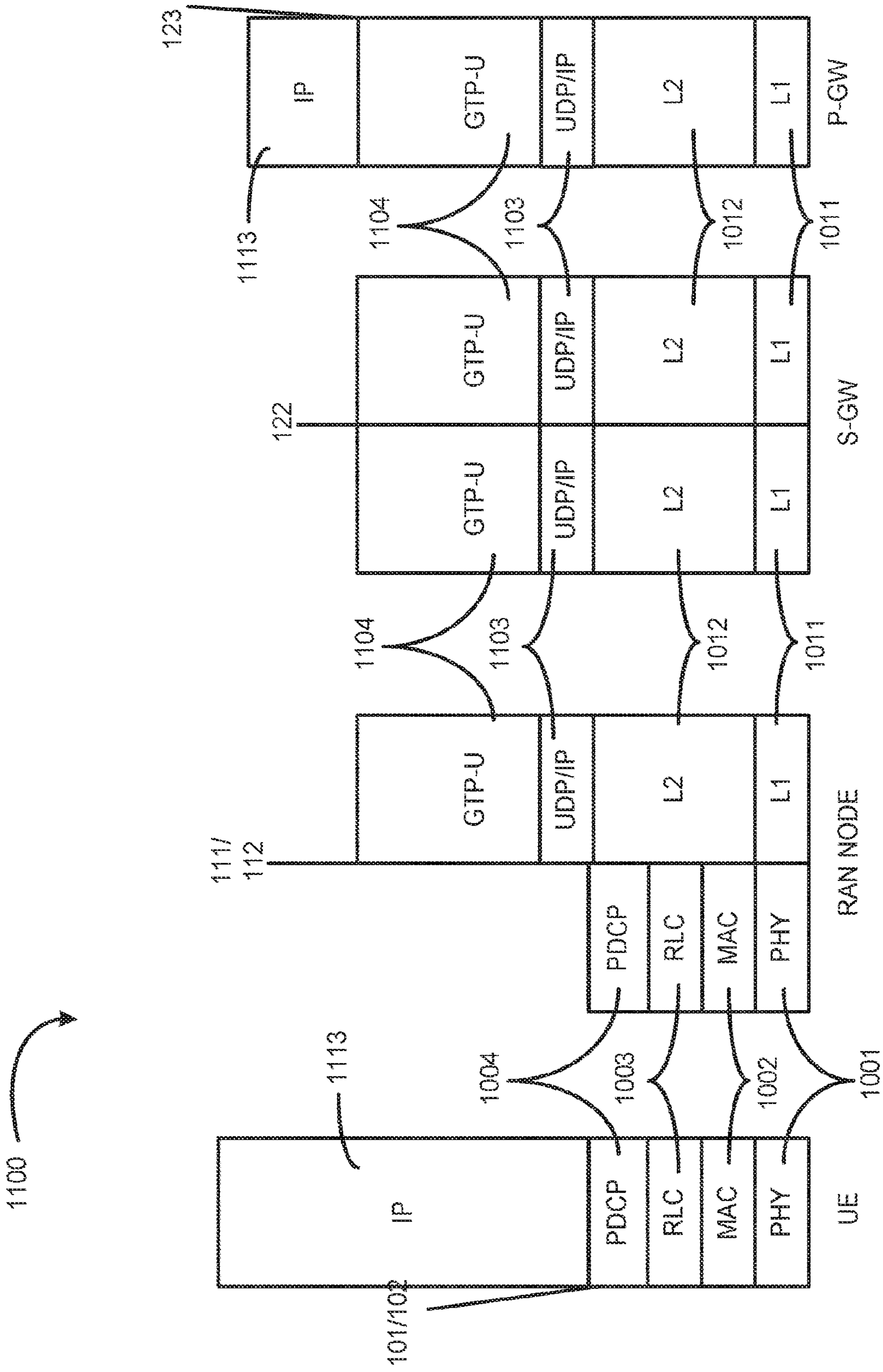
FIG. 11 is an illustration of a user-plane protocol stack in accordance with some embodiments.

FIG. 11 is an illustration of a user-plane protocol stack in accordance with some embodiments. In this embodiment, a user plane 1100 is shown as a communications protocol stack between the UE 101 (or alternatively, the UE 102), the macro RAN node 111 (or alternatively, the LP RAN node 112), the S-GW 122, and the P-GW 123. The user plane 1100 may utilize at least some of the same protocol layers as the control plane 1000. For example, the UE 101 and the macro RAN node 111 may utilize a Uu interface (e.g., an LTE-Uu interface) to exchange user-plane data via a protocol stack comprising the PHY layer 1001, the MAC layer 1002, the RLC layer 1003, and the PDCP layer 1004.

A General Packet Radio Service (GPRS) Tunneling Protocol for the user plane (GTP-U) layer 1104 may be used for carrying user data within the GPRS core network and between the radio access network and the core network. The user data transported can be packets in any of IPv4, IPv6, or PPP formats, for example. A UDP and IP security (UDP/IP) layer 1103 may provide checksums for data integrity, port numbers for addressing different functions at the source and destination, and encryption and authentication of the selected data flows. The macro RAN node 111 and the S-GW 122 may utilize an S1-U interface to exchange user-plane data via a protocol stack comprising the L1 layer 1011, the L2 layer 1012, the UDP/IP layer 1103, and the GTP-U layer 1104. The S-GW 122 and the P-GW 123 may utilize an S5/S8a interface to exchange user-plane data via a protocol stack comprising the L1 layer 1011, the L2 layer 1012, the UDP/IP layer 1103, and the GTP-U layer 1104. As discussed above with respect to FIG. 10, NAS protocols support the mobility of the UE 101 and the session management procedures to establish and maintain IP connectivity between the UE 101 and the P-GW 123.

Figure 12:
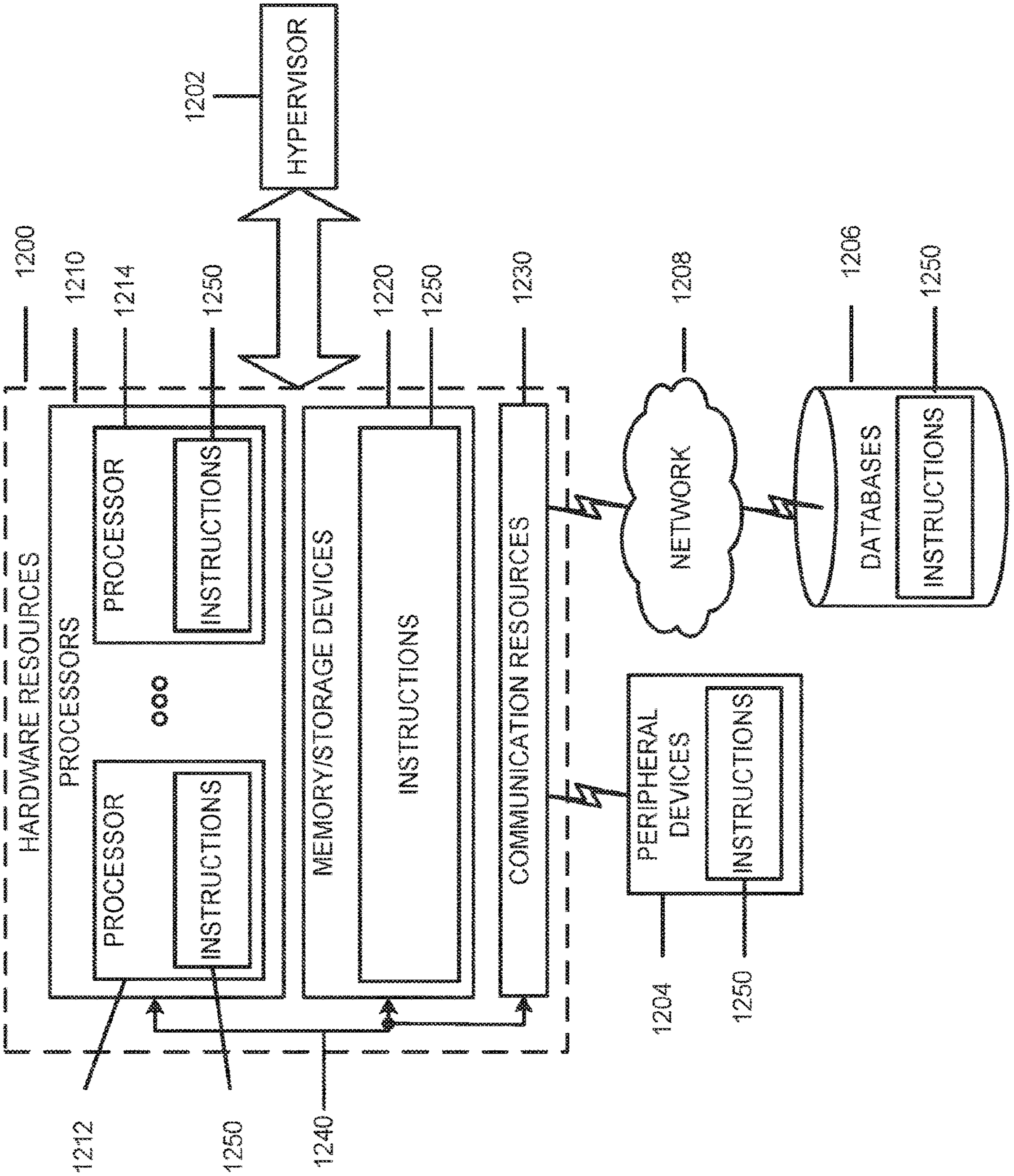
FIG. 12 is a block diagram illustrating components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., Network Functions Virtualization (NFV)) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application-specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to, any type of volatile or non-volatile memory such as dynamic random-access memory (DRAM), static random-access memory (SRAM), erasable programmable read-only memory (EPROM), electrically erasable programmable read-only memory (EEPROM), flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth®, components (e.g., Bluetooth® Low Energy). Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), within the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of the processors 1210, the memory/storage devices 1220, the peripheral devices 1204, and the databases 1206 are examples of computer-readable and machine-readable media.

Figure 13:
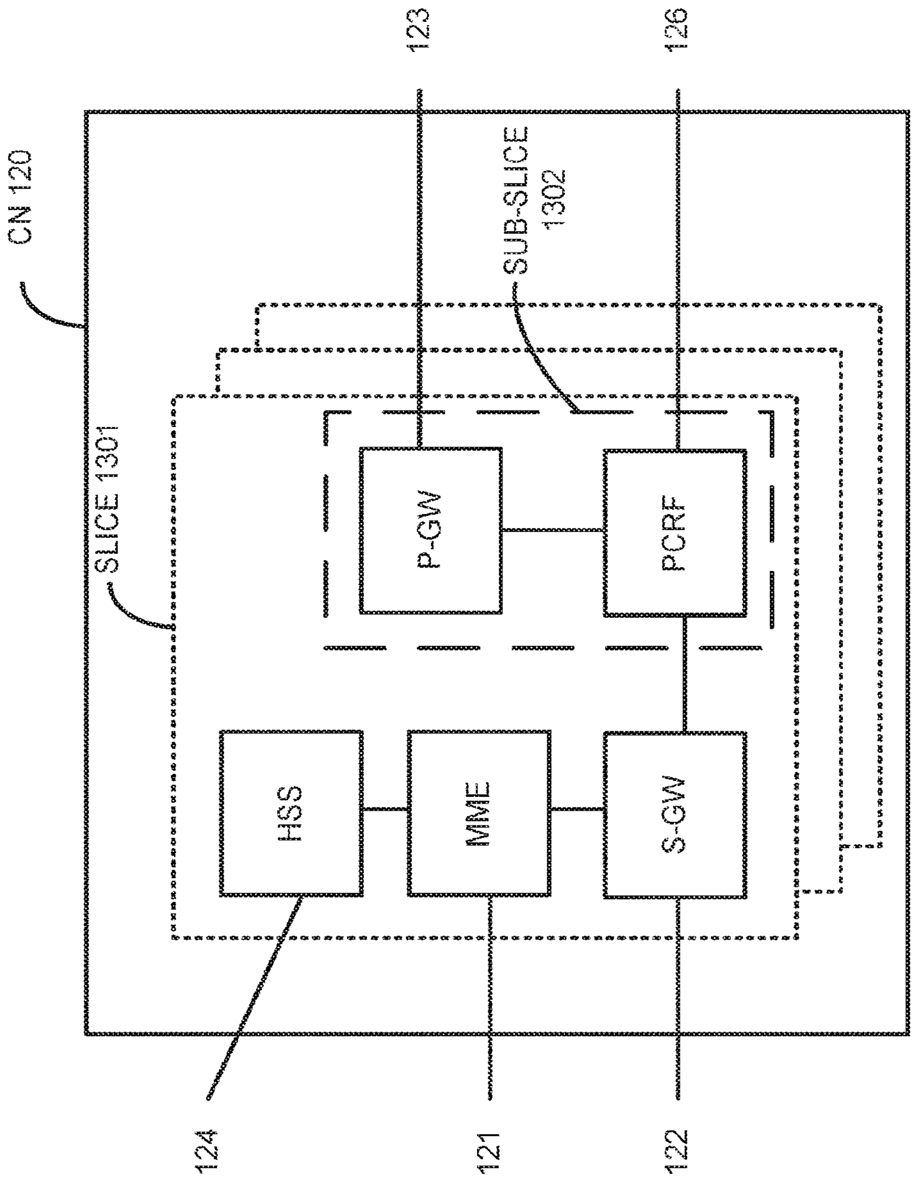
FIG. 13 illustrates components of a core network in accordance with some embodiments.

FIG. 13 illustrates components of the CN 120 in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments. Network Functions Virtualization (NFV) is utilized to virtualize any or all of the above-described network node functions via executable instructions stored in one or more computer-readable storage media (described in further detail below). A logical instantiation of the CN 120 may be referred to as a network slice 1301. A logical instantiation of a portion of the CN 120 may be referred to as a network sub-slice 1302 (e.g., the network sub-slice 1302 is shown to include the P-GW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 14:
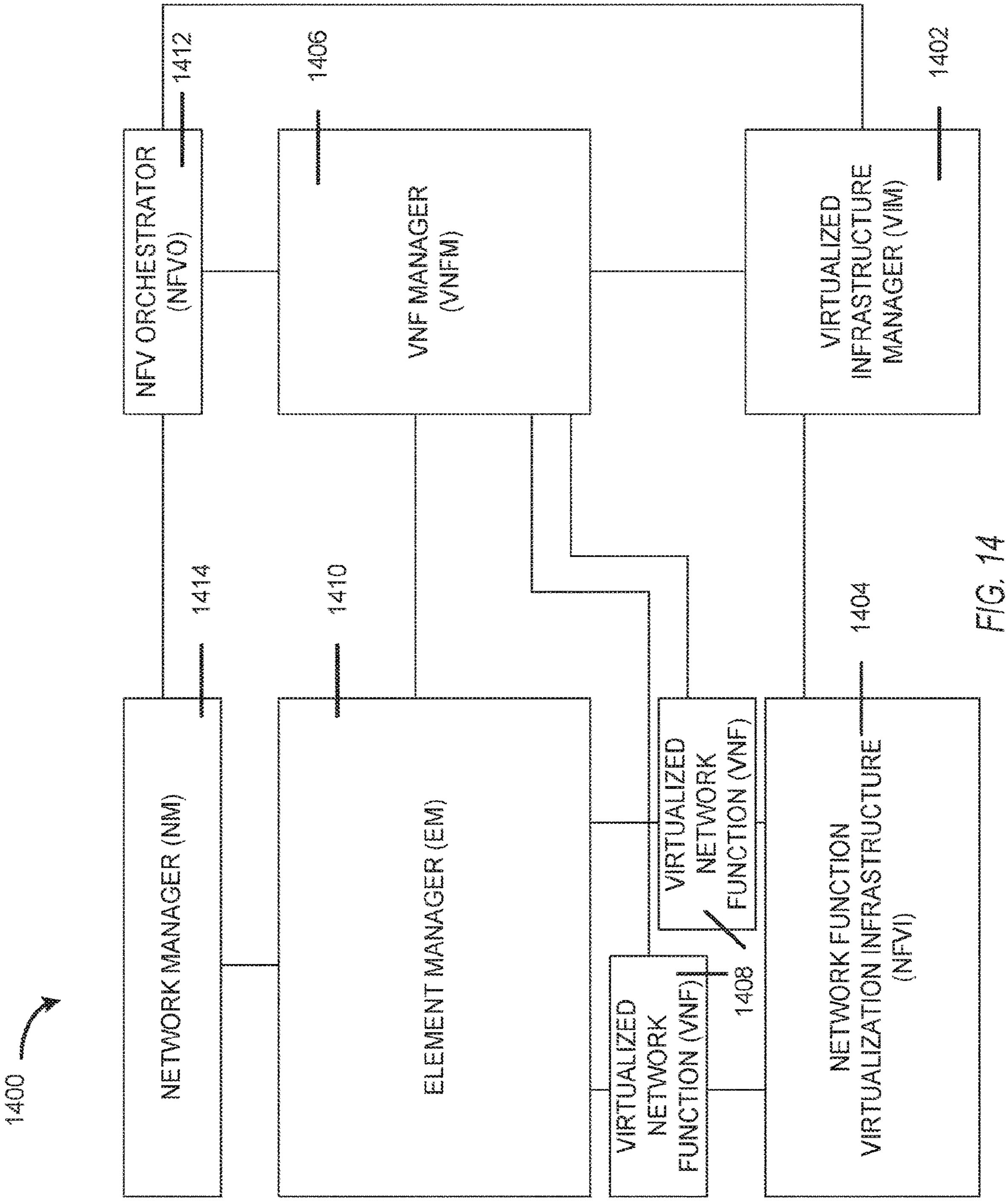
FIG. 14 is a block diagram illustrating components, according to some example embodiments, of a system to support various embodiments described herein.

FIG. 14 is a block diagram illustrating components, according to some example embodiments, of a system 1400. The system 1400 is illustrated as including a virtualized infrastructure manager (VIM) 1402, a network functions virtualization infrastructure (NFVI) 1404, a VNF manager (VNFM) 1406, virtualized network functions (VNFs) 1408, an element manager (EM) 1410, an NFV Orchestrator (NFVO) 1412, and a network manager (NM) 1414.

The VIM 1402 manages the resources of the NFVI 1404. The NFVI 1404 can include physical or virtual resources and applications (including hypervisors) used to execute the system 1400. The VIM 1402 may manage the life cycle of virtual resources with the NFVI 1404 (e.g., creation, maintenance, and teardown of virtual machines (VMs) associated with one or more physical resources); track VM instances; track performance, faults, and security of VM instances and associated physical resources; and expose VM instances and associated physical resources to other management systems.

The VNFM 1406 may manage the VNFs 1408. The VNFs 1408 may be used to execute EPC components/functions. The VNFM 1406 may manage the life cycle of the VNFs 1408 and track performance, faults, and security of the virtual aspects of the VNFs 1408. The EM 1410 may track the performance, faults, and security of the functional aspects of the VNFs 1408. The tracking data from the VNFM 1406 and the EM 1410 may comprise, for example, performance measurement (PM) data used by the VIM 1402 or the NFVI 1404. Both the VNFM 1406 and the EM 1410 can scale up/down the quantity of VNFs 1408 of the system 1400.

The NFVO 1412 may coordinate, authorize, release, and engage resources of the NFVI 1404 in order to provide the requested service (e.g., to execute an EPC function, component, or slice). The NM 1414 may provide a package of end-user functions with the responsibility for the management of a network, which may include network elements with VNFs, non-virtualized network functions, or both (management of the VNFs may occur via the EM 1410).

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While as described herein, non-transitory computer-readable media or a communication device-readable medium may be discussed as a single medium, the term "communication device-readable medium" may include a single medium or multiple media (e.g., a centralized or distributed database, and/or associated caches and servers) configured to store the one or more instructions used by circuitry to implement described operations.

The term "communication device-readable medium" may include any medium that is capable of storing, encoding, or carrying instructions for execution by a communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media Specific examples of communication device-readable media may include non-volatile memory, such as semiconductor memory devices (e.g., EPROM, EEPROM) and flash memory devices; magnetic disks, such as internal hard disks and removable disks: magneto-optical disks; RAM; and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), HTTP, etc.). Example communications networks may include a local area network (LAN), a wide area network (WAN), a packet data network (e.g., the Internet), mobile telephone networks (e.g., cellular networks), Plain Old Telephone Service (POTS) networks, wireless data networks (e.g., IEEE 1002.11 family of standards known as Wi-Fi®, IEEE 1002.16 family of standards known as WiMAX®), IEEE 1002.15.4 family of standards, an LTE family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple-User MIMO techniques. The term "transmission medium" shall be taken to include any intangible medium that is capable of storing, encoding, or carrying instructions for execution by the communication device, and includes digital or analog communications signals or other intangible media to facilitate communication of such software.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM). RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, UE, article, composition, formulation, or process that includes elements in addition to those listed after such a term in a claim is still deemed to fall within the scope of that claim. Moreover, in the following claims, the terms "first," "second," "third." etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:

at least one processor configured to cause a New Radio (NR) node to:
- generate a first message;
- transmit the first message to an other node; and
- receive, in response to the first message, a second message from the other node, wherein a bit in an initial octet of the second message indicates the existence of a highest successfully delivered packet data converge protocol (PDCP) protocol data unit (PDU) sequence number (SN) in the second message, and when the bit is set to '1', said receiving includes processing the highest successfully delivered PDCP PDU SN in the second message.

2. The apparatus of claim 1, wherein the NR node comprises a secondary node and wherein the other node comprises a master node (MN).

3. The apparatus of claim 1, wherein downlink (DL) user data accessed by the NR node is used in generating the first message and comprises a highest successfully delivered PDCP PDU SN.

4. The apparatus of claim 3, wherein a DL user data message comprises a DL discard field based on the highest successfully delivered PDCP PDU SN, the DL discard field indicating a SN up to and including which all NR PDCP PDUs are to be discarded by the other node, and wherein the DL user data message is transmitted from the NR node to the other node.

5. The apparatus of claim 1, wherein the NR node comprises a node hosting NR PDCP operations.

6. The apparatus of claim 5, wherein the at least one processor is further configured to cause the NR node to:
- access flow control data;
- generate a flow control configuration update using the flow control data;
- initiate transmission of the flow control configuration update to the other node; and
- processing a flow control configuration update acknowledgement from the other node.

7. The apparatus of claim 6, wherein the flow control data comprises a report polling parameter.

8. The apparatus of claim 7, wherein the report polling parameter indicates that the NR node hosting the NR PDCP operations requests a downlink (DL) delivery status report.

9. A method, comprising:

receiving, from a new radio (NR) node, a first message; and transmitting, in response to receiving the first message, a second message to the NR node, wherein a bit in an initial octet of the second message indicates the existence of a highest successfully delivered packet data converge protocol (PDCP) protocol data unit (PDU) sequence number (SN) in the second message, and when the bit is set to '1', this indicates for the NR node to process the highest successfully delivered PDCP PDU SN in the second message.

10. The method of claim 9, wherein the first message comprises a first PDU type and the second message comprises a second PDU type.

11. The method of claim 10, wherein the second message comprises a parameter indicating a highest transmitted NR PDCP SN.

12. The method of claim 11, wherein the second message comprises a parameter indicating a transmitted status associated with the highest transmitted NR PDCP SN.

13. The method of claim 10, wherein the second message comprises a parameter indicating a highest retransmitted NR PDCP SN.

14. The method of claim 13, wherein the second message comprises a parameter indicating a status associated with the highest retransmitted NR PDCP SN.

15. The method of claim 9, wherein downlink (DL) user data accessed by the NR node is used in generating the first message and comprises a highest successfully delivered PDCP PDU SN.

16. The method of claim 15, wherein a DL user data message comprises a DL discard field based on the highest successfully delivered PDCP PDU SN, the DL discard field indicating a SN up to and including which all NR PDCP PDUs are to be discarded by the other node, and wherein the DL user data message is transmitted from the NR node to the other node.

17. A network node, comprising:

one or more antennas;

wireless communication circuitry coupled to the one or more antennas; and at least one processor operably coupled to the wireless communication circuitry and configured to cause the network node to:

generate a first message;

transmit the first message to an other node; and receive, in response to the first message, a second message from the other node, wherein a bit in an initial octet of the second message indicates the existence of a highest successfully delivered packet data converge protocol (PDCP) protocol data unit (PDU) sequence number (SN) in the second message, and when the bit is set to '1', said receiving includes processing the highest successfully delivered PDCP PDU SN in the second message.

18. The network node of claim 17, wherein the network node is a new radio (NR) node comprising a secondary node and wherein the other node comprises a master node (MN).

19. The network node of claim 17, wherein downlink (DL) user data accessed by the network node is used in generating the first message and comprises a highest successfully delivered PDCP PDU SN.

20. The network node of claim 19, wherein a DL user data message comprises a DL discard field based on the highest successfully delivered PDCP PDU SN, the DL discard field indicating a SN up to and including which all NR PDCP PDUs are to be discarded by the other node, and wherein the DL user data message is transmitted from the network node to the other node.

* * * * *